United States Patent [19]

Stephenson

[11] 3,766,519

[45] Oct. 16, 1973

[54] METHOD FOR PROCESSING SURFACE DETECTED SEISMIC DATA TO PLOTTED REPRESENTATIONS OF SUBSURFACE DIRECTIONAL SEISMIC DATA

[75] Inventor: Lee P. Stephenson, Fullerton, Calif.

[73] Assignee: California Research Corporation, San Francisco, Calif.

[22] Filed: June 8, 1970

[21] Appl. No.: 44,648

Related U.S. Application Data

[63] Continuation of Ser. No. 416,947, Sept. 24, 1964, abandoned.

[52] U.S. Cl. 340/15.5 DS, 340/15.5 R, 340/15.5 CP, 346/33 C
[51] Int. Cl. ............... G01v 1/24, G01v 1/28
[58] Field of Search ............ 340/15.5 DS, 15.5 CP; 346/33 C

[56] References Cited
UNITED STATES PATENTS

| | | | |
|---|---|---|---|
| 2,144,812 | 1/1939 | Rieber | 340/15.5 |
| 2,914,854 | 12/1959 | Westphal | 340/15.5 X |
| 3,038,661 | 6/1962 | Klein | 340/15.5 X |
| 3,127,585 | 3/1964 | Alexander et al. | 340/15.5 |
| 3,149,302 | 9/1964 | Klein et al. | 340/15.5 |
| 3,149,303 | 9/1964 | Klein et al. | 340/15.5 |

Primary Examiner—Benjamin A. Borchelt
Assistant Examiner—H. A. Birmiel
Attorney—A. L. Snow, F. E. Johnston, C. J. Tonkin and G. W. Wasson

[57] ABSTRACT

Individual geophones of a surface array of geophones detect the arrival of energy transmitted into the earth from a seismic source and reflected from subsurface reflectors. A record of traces of seismic data is a time based recording of signals representing the reflection energy (called events) detected by each individual geophone.

When the geophones are treated as an array, the energy detected by the array may be analyzed to provide both amplitude and direction identification for the reflected energy. By systematically processing the record of traces representing the energy reflected to the geophone array it is possible to isolate directional energy, to pick reflection events within the isolated energy and to plot these selected events along a directionally distinct representation of the subsurface path of seismic energy from the surface source to the subsurface reflector and back to the surface geophone array.

9 Claims, 23 Drawing Figures

United States Patent [19]
Stephenson
[11] 3,766,519
[45] Oct. 16, 1973
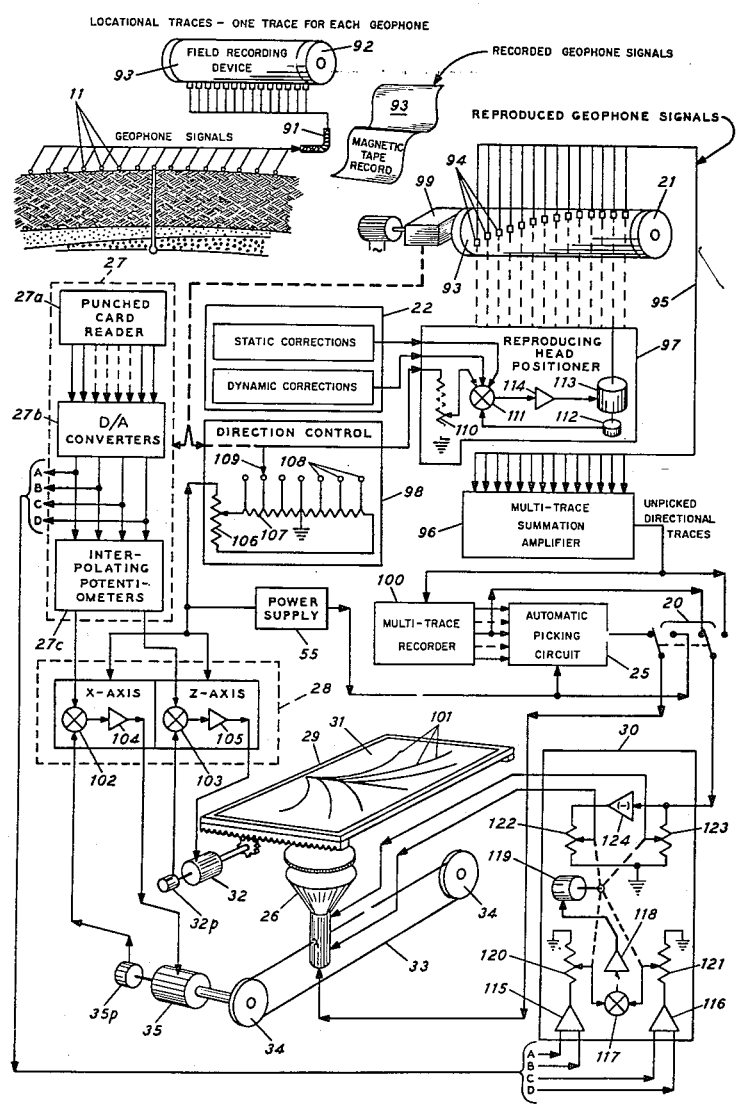

INVENTOR
LEE P. STEPHENSON

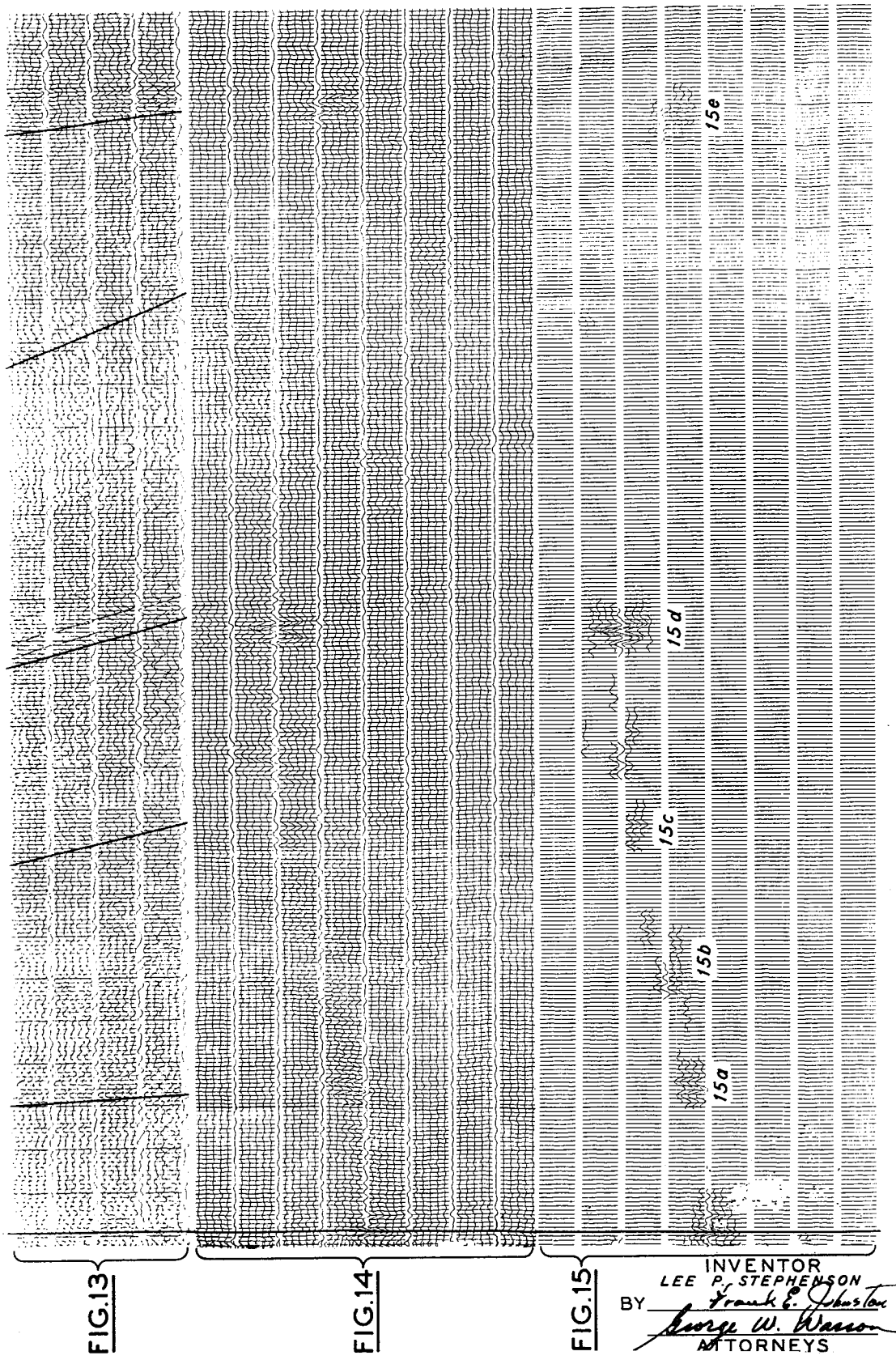

METHOD FOR PROCESSING SURFACE DETECTED SEISMIC DATA TO PLOTTED REPRESENTATIONS OF SUBSURFACE DIRECTIONAL SEISMIC DATA

This application is a continuation of Ser. No. 416,947, filed Sept. 25, 1964, now abandoned.

This invention relates to a method and apparatus for automatically processing and displaying seismic data. In accordance with this invention, information in the seismic data relating to underground earth formation may be automatically processed to a resulting display representing the underground formations in their proper spatial positions with respect to a reference point at or near the earth's surface. Furthermore, the processing and resulting display of the data is done without the necessity for intervening human examinations, measurements, or calculations. This application is a continuation-in-part of my copending application Ser. No. 803,906 filed Apr. 3, 1959 for Automatic Seismic Data Processing Method and Apparatus, now abandoned in favor of this continuing application.

Present day methods of seismic surveying involve the initiation of a seismic wave in a geological mass through which the seismic energy is transmitted to be reflected and refracted by the discontinuities in acoustic impedance associated with interfaces between the rock layers, or strata within the earth. Reflected, refracted and diffracted energy from these horizons within the earth is detected at a plurality of geophones distributed over the earth's surface, and a record, preferably in some reproducible form, is produced of the series of individual signals from each of the surface geophones. This record indicates, as a function of time, the mechanical movement of the earth at the location of each of the geophones due to energy received from reflecting or refracting horizons within the earth.

Prior art systems for analysing information contained in seismic records have disclosed methods for making the static and dynamic time adjustments between the signal traces from the various geophones necessary to produce a corrected printed record indicating the energy received at the earth's surface by the several geophones. From this record an experienced seismologist may draw certain inferences regarding the subsurface structure within the geological mass being surveyed. From measurements indicating the elapsed time between the initiation of the seismic wave and the arrival of the returned energy at each of the several geophones, the attitudes and the distances of the reflecting or refracting horizons from the point of generation of the seismic waves may be determined if, in addition, certain velocity information is known or assumed about the earth materials.

In the normal course of analyzing such a record, the seismologist must first "pick" the record; that is, he must detect by visual observation of the recorded information all evidence for the presence of coherent reflected or refracted energy, and note the times of arrival of such "events" at each of the several geophone locations. From these arrival times and a knowledge or estimation of the seismic velocities, he can then compute, by any of several well-known methods, and plot to a suitable scale, the positions in the earth of the geological features responsible for the appearance of the events upon the seismic record. The seismologist may also make use of the distinctive appearance or "character," of the seismic events in following them from record to record and in associating them with particular geologic features. The resulting synthesized picture of the subsurface geometry derived from the picked and plotted events is commonly referred to as a "migrated" seismic section, and the individual seismic events whose positions have been computed and plotted relative to a reference point are said to have been "migrated."

It is commonly found that the visual detection of coherent energy is rendered difficult by the presence of interfering "noise" upon the seismic record. This "noise" may be caused by external factors such as wind, traffic, and the movements of large animals; but of even greater importance is the noise associated with the initiation of the seismic wave and appearing in such forms as ground roll, "hole" noise, and energy scattered from minor geological discontinuities. In addition, the reflected or refracted events of interest often interfere with each other, especially in those cases where the subsurface geometry is relatively complex. The sum total of noise and interference tends to obscure the reflected or refracted events of interest, making their detection more difficult and resulting in inaccuracies in the determination of their arrival times and characters. Thus, the independent analysis of a seismic record by each of several seismologists may produce different interpretations based upon the same seismic information, for an anylsis is, to a certain extent, an arbitrary determination governed by the experience and ability of the seismologist making it.

This serious drawback to the interpretation of seismic information was early recognized by Frank Rieber in several of his published articles. His early work has resulted in the issuance of many patents in his name, including U.S. Pat. No. 2,144,812, issued Jan. 24, 1939, entitled "Method of Geophysical Exploration," wherein a method has been described for deriving information infomation from energy received at a multistationed surface geophone spread. In this present specification, reference will be made to certain conceptions of Rieber; however, in the most part these references will be to information derived from early suggestions made by Rieber that have been expanded and improved. These references to Rieber are made, in the light of present day advances in seismology, and must be considered in that light in order to appreciate their true relevance to the material of the present specification.

The method of the noted earlier patent to Rieber involved the repeated combining or summing of the recorded signals from a plurality of surface geophones. Each sum was made with the original signals relatively delayed with respect to each other. In the Rieber method the relative delay imposed between signal traces from neighboring geophone was the same from geophone to geophone in any individual combination or sum. However, each individual combination or sum employed a different repetitive time delay between the signal traces, consistent throughout that individual combination or sum. The purpose was to use the fact that when seismic energy is returned to a surface geophone spread, the wave front of the energy will encounter the individual geophones in a determinable order established by the direction from which the energy is returning. In the system suggested by Rieber, a new multitrace record of combined geophone signals was produced by the method of scanning across the original multitrace record at incrementally different angles to the time axis of the original record. A separate trace was produced on the derived record for each of the incrementally different transverse scans of the original record so that each of the separately recorded traces would contain information for incrementally different relative time delays between the geophones. Through these incrementally different transverse scans of the original record, all signals of the original seismic record were summed in new combinations, and where a returned wave had energized successive individual geophones in a particular sequential order, the scanning of the original seismic record in accordance with this sequential order of reception would produce an enhanced signal. The enhanced signal was produced when the transverse scanning established, in effect, a synthesized array of geophones parallel to the wave front of the reflected energy as it returned to the earth's surface. Any signals arriving at the geophone array in a time-sequential order other than that produced by energy returning to the array from a direction corresponding to the particular angle of transverse scanning of the original record would tend either to cancel or to obscure each other, whereas signals arriving at the geophone array in the correct time sequence would be additive, and in effect, series enhanced.

This present application is related to a method employing some of the Rieber suggestions and is directed to a system for further analyzing the information contained in a conventional seismic record and for the use of this information to actuate a seismic data display apparatus whereby information concerning subsurface reflecting or refracting horizons within the subsurface earth strata may be plotted automatically to eliminate the necessity for prior interpretation by an experienced seismologist. In accordance with the method of the present invention, the seismic traces derived from seismic signals received by a multigeophone spread at the earth's surface are first adjusted for the static and dynamic time corrections well known to, and commonly applied by, those skilled in the art of seismic surveying. From this corrected seismic record, a multitrace "beam-steered" record is produced through repeated seismic trace combinations, and from beam-steered record and appropriate velocity data, an automatic plotting device is actuated to provide a migrated display of the information received at the geophone array. The method may further be modified to include automatic event picking through application of signal strength and signal direction-of-arrival criteria so that the plotting of the information contained in the original record may be automatically restricted to the significant seismic reflections within the record.

The object of the present invention, therefore, is an automatic seismic data processing and display apparatus and the method and apparatus for analyzing seismic data whereby information derived from a geophone spread at the earth's surface may be automatically analyzed and processed for eventual automatic plotting on a display surface in a manner such that reflecting or refracting horizons within the earth may be represented in their proper positions in space.

A further object of the present invention is a novel method of display of seismic information whereby common human errors are eliminated, the true character of the seismic signal is preserved, and the complete analysis of seismic data is made with greater accuracy and rapidity.

A further object of the present invention is a novel display of seismic data in the form of directional graphical seismic traces.

Further objects and features of the invention will be fully apparent to those skilled in the art from the specification and appended drawings illustrating certain preferred embodiments in which:

FIG. 13 is an actual seismic record to greatly reduced scale of locational seismic traces from a geophone spread of twenty-four geophones;

FIG. 14 is a record of directional seismic traces produced from the locational traces of FIG. 13;

FIG. 15 is the record of FIG. 14 with events automatically picked;

Figure 19:
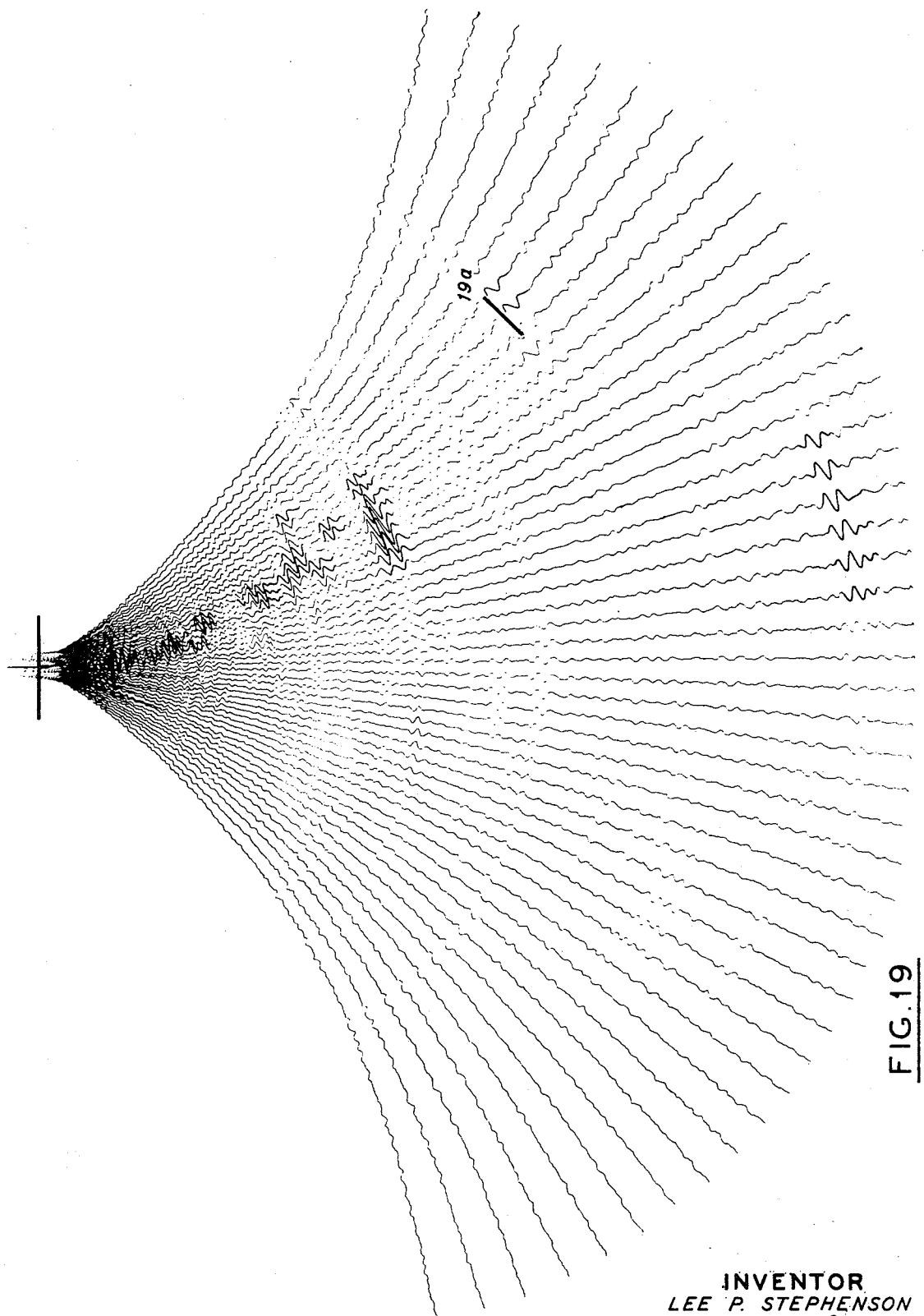
Figure 20:
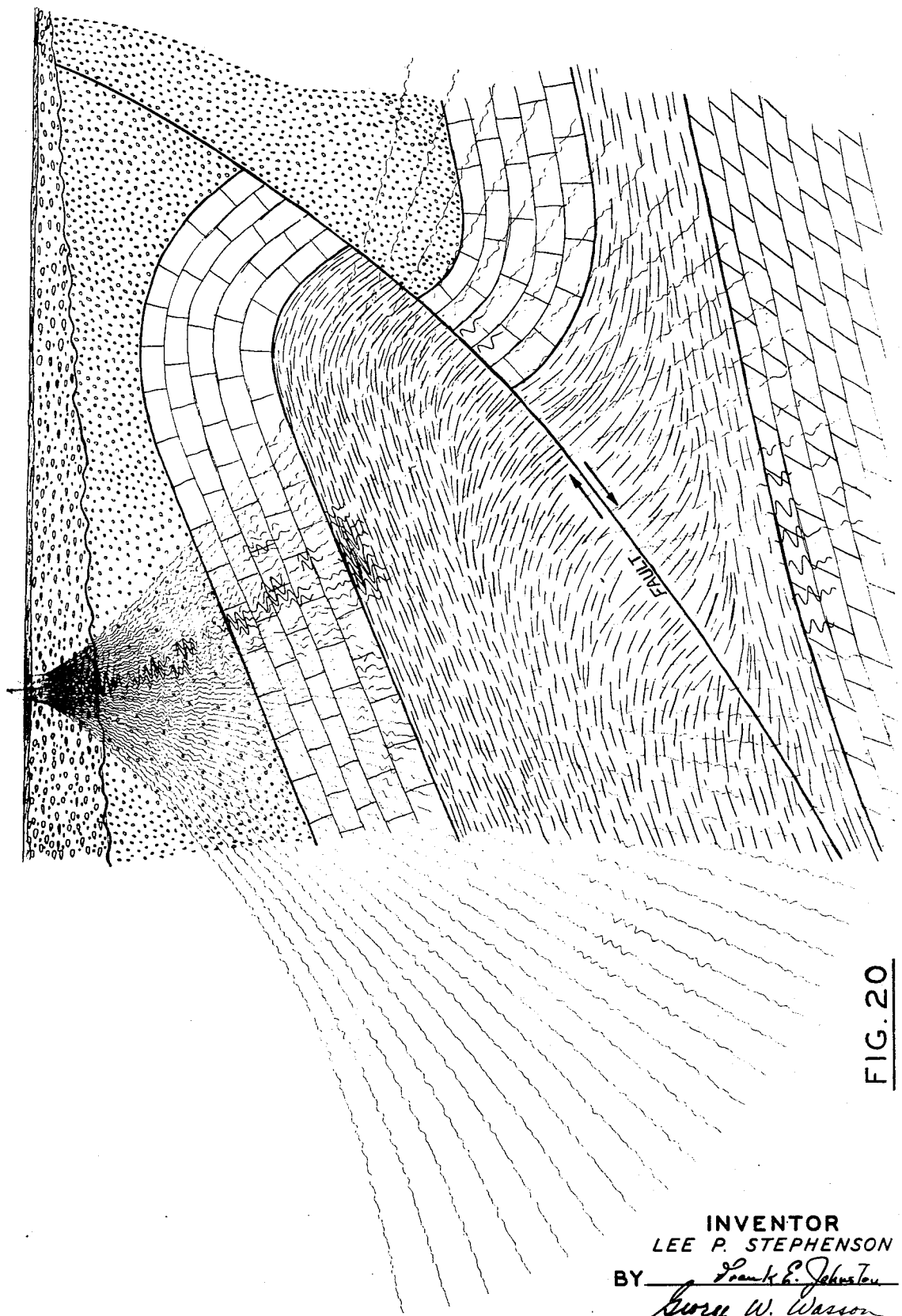
Figure 21:
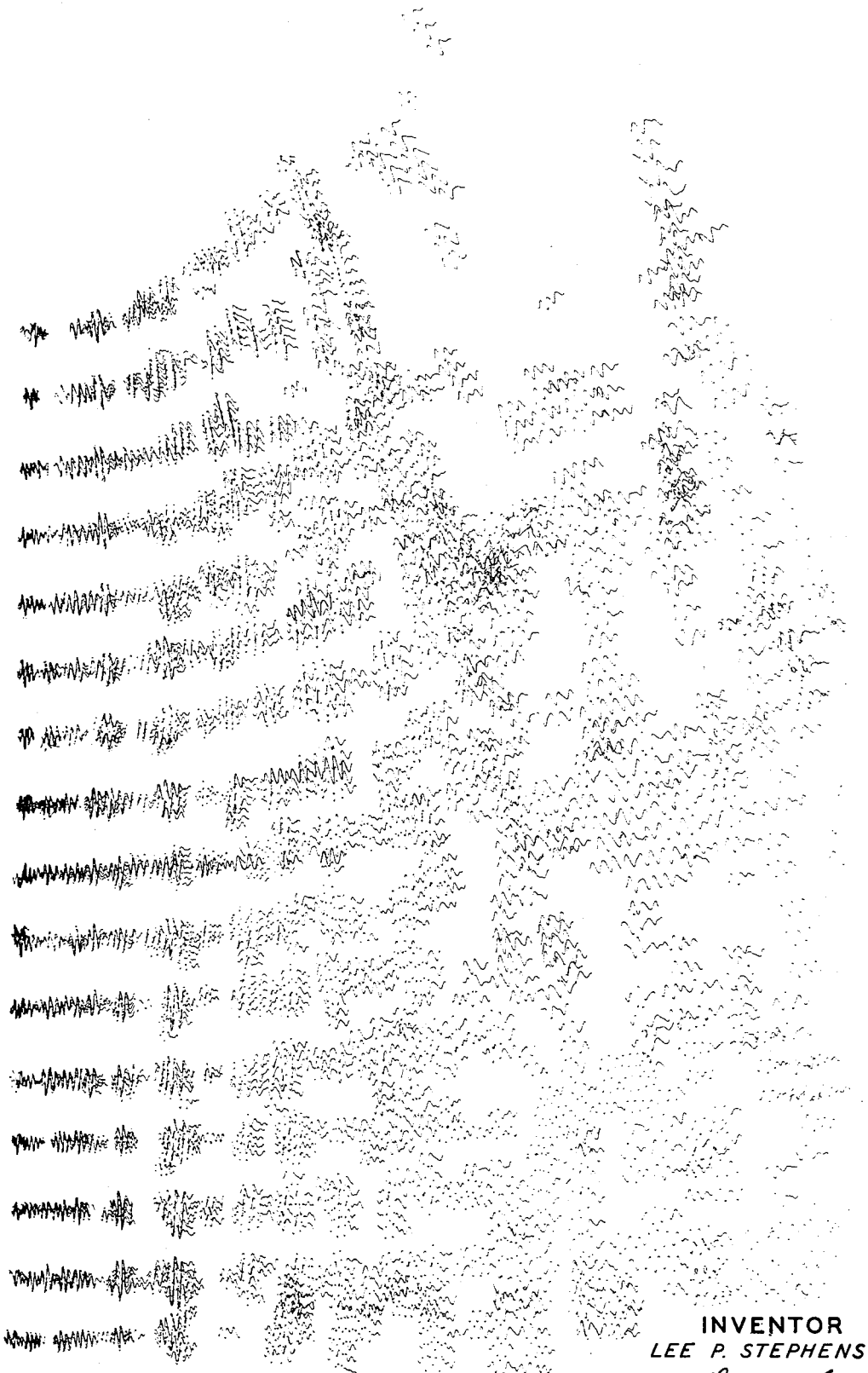
Figure 22:
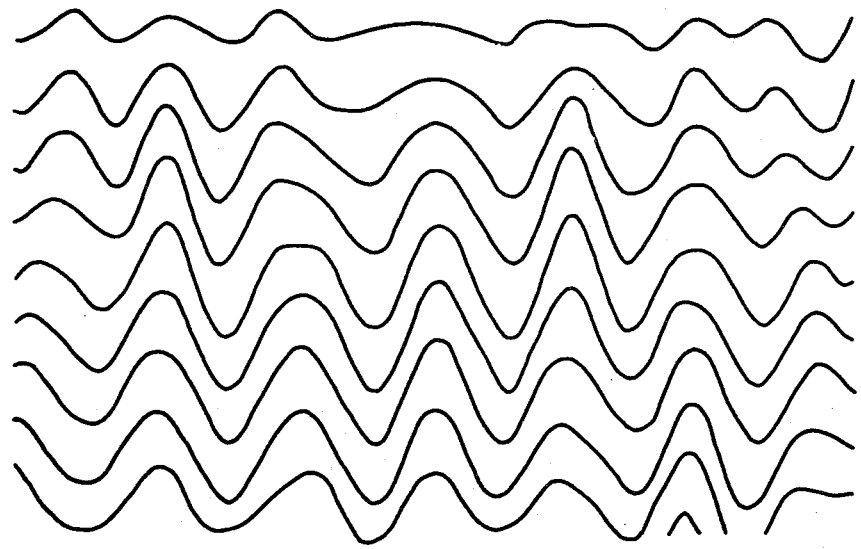
Figure 23:
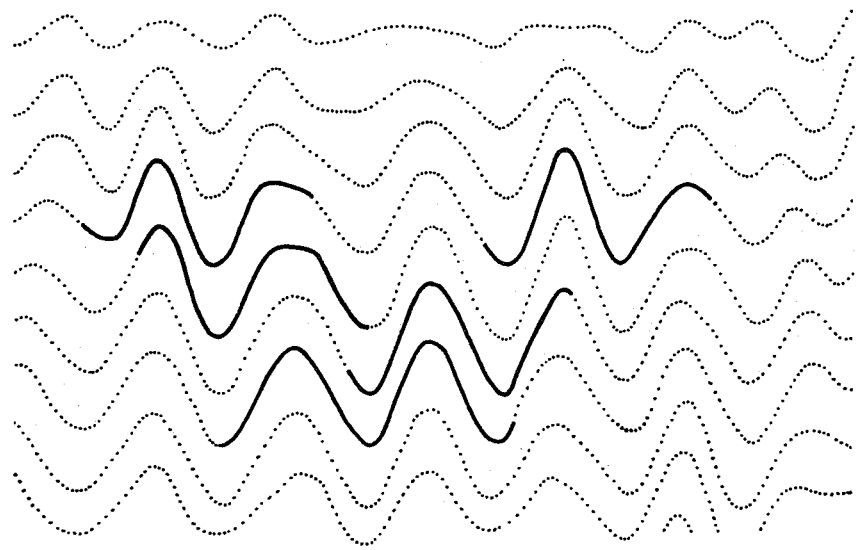

FIG.. 18 is a migrated curved ray seismic display of the directional seismic traces of FIG. 14;

FIG. 19 is a migrated curved ray display of the automatically picked directional seismic traces of FIG. 15;

FIG. 20 is the display of FIG. 19 with a conception of a geological formation in cross-section superimposed upon the display to illustrate reflecting horizons that could produce the record of FIGS. 13–19;

FIG. 21 is a display of a plurality of migrated curved ray seismic records spaced with respect to each other in accordance with the positioning of the geophone spreads at the earth's surface;

FIG. 22 is a portion of a sonograph record;

FIG. 23 is the record of FIG. 22 showing the application of full event picking criteria.

In the art of reflection seismic surveying, a seismic impulse is initiated at or near the earth's surface to establish an elastic wave for transmission through the earth. Any discontinuity or variation in the structure within the earth will reflect, refract, or diffract this wave train, or a portion thereof, so that the record made at a receiving point will comprise a number of arriving waves, each derived from the original impulse, and each differing from the others in time of arrival or in magnitude or both. Generally speaking, seismic energy will be reflected by subsurface formations that are substantially tangent to the wave front as it travels through the earth formations. The energy reflected by the subsurface reflectors will return to the earth's surface in the form of elastic movements of the earth formations. These movements then may be detected by individual geophones and converted to electrical signals for the production of reproducible traces on a reproducible recording means. These traces will hereinafter be referred to as locational seismic traces. The information in each of these seismic traces contains, among other things, the elapsed times between the initiation of the seismic impulse and the arrivals of the various individual events along the seismic trace.

Figure 1:
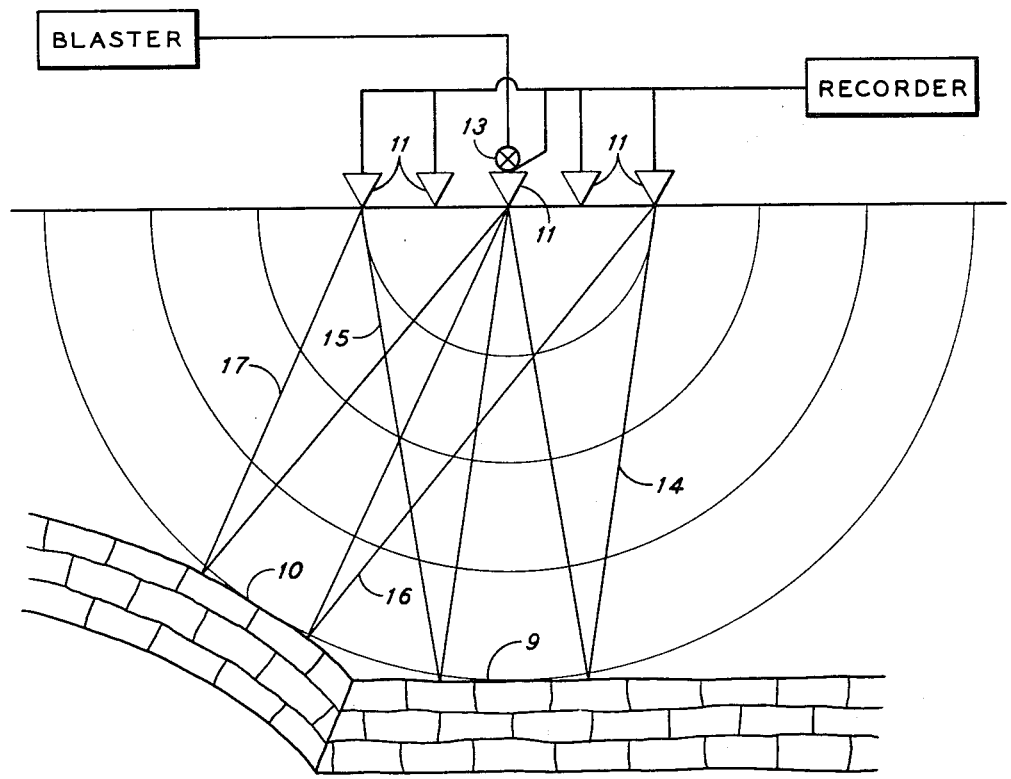
FIG. 1 is a sectional view through a geological mass illustrating representative paths for seismic energy.

Referring now to FIG. 1 wherein a faulted subsurface formation of a geological mass is illustrated, it may be seen that at least some of the information derived from the seismic motion detected by the geophone spread at the earth's surface will be contained in reflection events from reflector 9 and reflector 10. For the purpose of this illustration, only five geophones 11 are illustrated as positioned at the surface of an earth formation 12 wherein the reflectors 9 and 10 are located. The geophone spread is positioned about a hot point 13, here shown at the center of the spread, and may consist of many more geophones than the five illustrated.

As energy is transmitted from the shot point 13 into the earth formation 12, it strikes discontinuities at the reflecting horizons 9 and 10 causing reflections to be returned to the geophone spread along paths such as 14, 15, 16 and 17. Because the reflector 9 is directly below the shot point 13, the energy will be reflected substantially vertically to the geophone spread. Under the conditions intended to be represented in FIG. 1, reflector 9 is of such distance below the earth's surface that the wave front of the reflected energy is substantially parallel to the earth's surface when it arrives at the geophones 11 within the spread. The seismic energy travelling along paths 14 and 15 will arrive at each geophone within the spread at substantially the same elapsed time so that the record produced by the geophone spread will contain an event at substantially the same elapsed time along each trace. However, the energy from the tilted reflector 10 that returns along paths 16 and 17 will be received at different elapsed times by the geophones within the spread. The separate traces produced by the separate geophones for the reflection from reflector 10 will show the event arriving at different elapsed times. Part of the energy received by the individual geophones 11 at a particular instant and reproduced on its seismic trace could be reflected from both reflectors 9 and 10 since some parts of these two reflectors are approximately the same distance from the shot point 13. Because of this coincidence in time, the combined energies of the two reflections could intermingle and be substantially hidden one in the other so that neither reflector would be easily defined by simple inspection of the conventional seismic record.

In accordance with certain of the early concepts of Rieber, it is possible to combine the signals received by the several geophones to select directional seismic information. To accomplish this selection in the manner of the present invention, the geophone spread becomes in effect a directionally sensitive geophone array. The array will have directional sensitivity in a lobe or beam pattern similar to that shown in FIG. 2 and the directional sensitivity lobe or beam may be moved in discrete steps by selectively adding incrementally time-delayed signals from the traces produced by the individual geophones. Each of the selectively added combinations of the relatively delayed signals may then be considered as a separate record trace of directionally received seismic energy.

Figure 2:
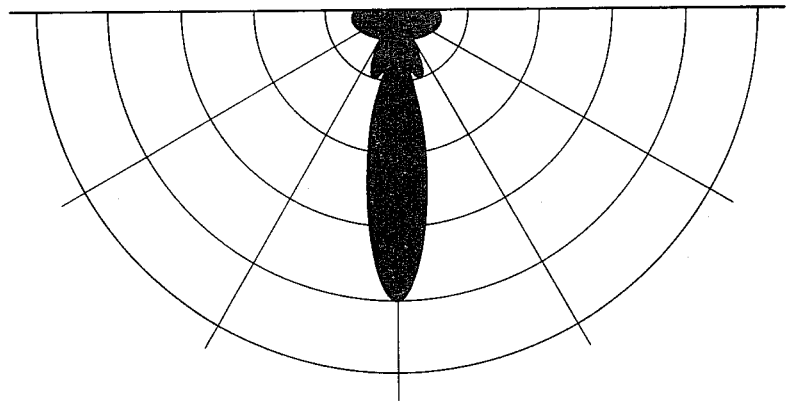
FIG. 2 is a sensitivity graph for a geophone array of particular geophone spacing.

FIG. 2 indicates the directive characteristics of a geophone array, showing the relative strength of the signal that would be recorded by the array of geophones if the time delay combination of the geophone outputs were to be held constant and the direction of an incoming constant amplitude signal were to be moved in the plane passing through a linear array of geophones, angularly about the center of the array. It can be shown mathematically that for transient signals of the character generally encountered in seismic work, the width of the directivity pattern or, as it is sometimes called, the sensitivity lobe, is related to the dominant period of the seismic signal. When compared to the response which results when the signal arrives simultaneously at all geophones in the array, the amplitude of the response will be reduced by approximately one-half when the signal arrives at one end of the array 0.6 of a period before it arrives at the other end.

Figure 3:
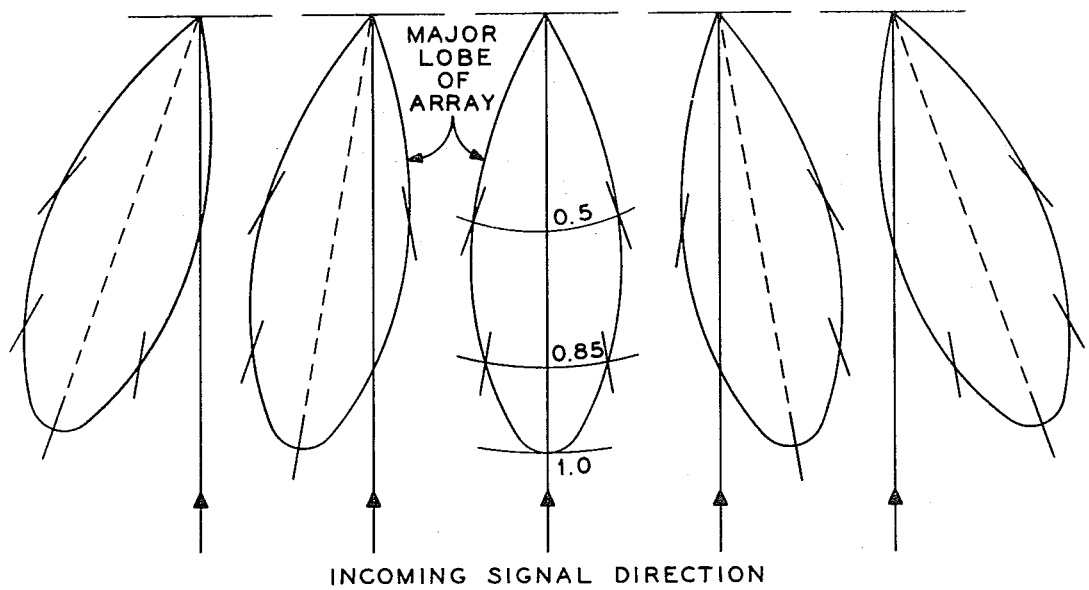
FIG. 3 is a graphic representation of the change in directional selectivity of an array of geophones as the major lobe of an array is moved with respect to a seismic signal source.

Just as the response varies if the direction of the incoming signal changes while the relative time delay interval of the geophones is held constant, so does the response vary when the relative time delay of the geophones is changed while the direction of the incoming signal remains constant. In FIG. 3 the incoming signal is indicated to be coming from a fixed direction, namely from vertically below the geophones. The five different parts of the FIG. 3 are intended to represent the same set of geophones time delayed in five different ways so that the directional sensitivity is a maximum in five different directions. In practical geophysical prospecting, it is necessary to decide in how many different ways to time delay the signals received by the geophones, or in effect, in how many different directions to point the sensitivity lobe of the geophone array. Each direction corresponds to a different set of relative time delays between the received geophone signals, and the combining of each set of locational traces into a set of directional traces requires a significant amount of time and effort, no matter by what specific method it is done. Therefore, it is of interest to know the fewest number of directions that the sensitivity lobe may be pointed without missing a significant signal coming from some direction intermediate to two of the chosen directions. Both theory and experiment have been used in deciding what is the best number of directions. It has been found best in the usual case to vary the direction in steps such as indicated in FIG. 3. In each directional step, the time delays between the geophones are changed so that the imposed total delay, between the end geophone traces will change by approximately 0.3 of the dominant period of the seismic energy being received. It will then require two directional steps for a new sensitivity lobe to be pointing in the half-amplitude direction of a previous lobe.

When the seismic signal is of very poor quality, it has been found advantageous to sample oftener, changing direction by steps such that the total imposed time delay between the geophone traces changes by only 0.1 of the dominant period of the energy being received. On the other hand, when the signals being received are of very good quality, with little noise, it is sometimes adequate to change direction in large steps such that the total imposed time delay between end geophone traces changes by 0.6 of the dominant period of the energy being received. A suitable range of change in the total imposed time delays between end traces is, therefore, 0.1 to 0.6 of the dominant period of the seismic energy being received, with the intermediate value of 0.3 being the usual optimum.

It has now been shown how a multigeophone seismic record contains information that may be directionally selected and how the signals from individual geophones within a spread should be relatively delayed to provide for optimum reception characteristics when combined. It should be understood that the manipulation of time delays between geophones within the spread is not accomplished by actual physical movement of the geophones nor is it usually accomplished by time delaying individual signals in an initial recording. The directional manipulation of the geophones as an array is usually accomplished after the original geophone signals have been recorded in a conventional reproducible seismic recording in which the signals received by the individual geophones are separately recorded; however, the relative time delays could be imposed on the signals prior to the initial recording.

In the usual beam steering process, in which the seismic signals are first directly recorded on a reproducible recording medium, the original traces are transformed during subsequent reproduction using movable reproducing heads or similar devices and suitable summing circuits. A second record is produced of the combined or summed signals from the geophones with the original individual geophone signals relatively delayed or advanced in time, in accordance with a predetermined directional sequence for the steering of the geophone array. Each of the different summations or original geophone outputs will produce a separate trace and each of these separate traces will be recorded as directional information detected by the array hereinafter referred to as a directional seismic trace.

Figure 6:
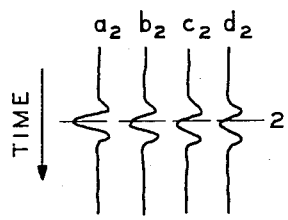
FIGS. 6 and 7 are portions of multitrace records of energy received in the directions as illustrated in FIG. 5.
Figure 7:
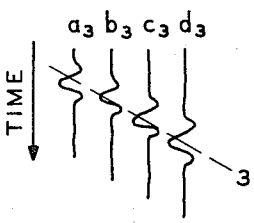
Figure 8:
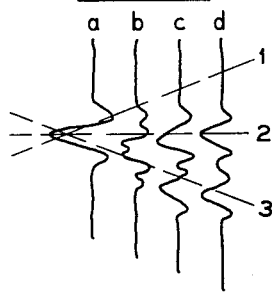
FIG. 8 is a composite of the portions of multitrace records of FIGS. 6 and 7.
Figure 5:
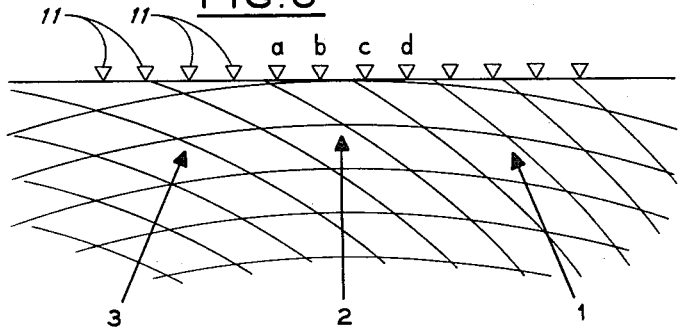
FIG. 5 is a graphic illustration of reflected energy being received at a geophone array.

Reference should now be had to FIGS. 5 through 9 where the production of a beam-steered record is indicated in graphic form. FIG. 5 illustrates a geophone spread including a plurality of individual geophones 11 with the central four of the spread identified by letters $a$, $b$, $c$, and $d$. Possible paths of reflected seismic energy through an earth formation are designated by the arrows 1, 2, and 3, indicating energy arriving from directly below the spread and to each side of below the spread. Arrow 1 indicates a typical direction from which no reflection energy is returning. FIG. 6 illustrates signal traces on a multitrace seismic record for the reception of energy arriving in the direction of the arrow 2. In these signal traces, it may be seen that each of the geophones detects seismic energy at the same time. FIG. 7 illustrates the reception of energy in the direction of arrow 3 wherein the trace $a3$ receives the energy first and each of the subsequent traces i $b_3, c_3, d_3$ receive their energy at some time differential after the first reception of energy at the geophone $a_3$. The traces of FIGS. 6 and 7 would indicate the reception of energy if the energy coming from the directions 2 or 3, respectively, were the only energy to be received at the geophone spread. FIG. 8 illustrates the composite grouping of the two signals of FIGS. 6 and 7 as they might appear if they arrived together at the geophone spread, as for instance, if reflected from horizons 9 and 10 of FIG. 1. Each of the wiggles of the traces $a$, $b$, $c$, and $d$ of FIG. 8 would be a combination of the information found in the traces of FIGS. 6 and 7 wherein trace $a$ would comprise the algebraic sum of the signals as illustrated in FIGS. 6 and 7, trace $d$ would illustrate the signals arriving at two different times such that neither signal would amplify or destroy portions of the other signal, and traces $b$ and $c$ would indicate intermixing of the two signals.

Figure 9:
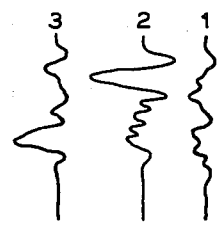
FIG. 9 is a portion of a beam-steered record as prepared as indicated in FIG. 8.

Also shown in FIG. 8, in the form of dotted lines designated 1, 2 and 3, are three different relative time delay relationships for combining the signals found on the composite record. The relationships, as shown, would be those for selecting the signals arriving in the directions corresponding to the arrows shown in FIG. 5. Summing the signals along the line designated 1 would produce a signal as is illustrated in FIG. 9 on the trace designated 1. It should be understood that this signal would show no coherent energy coming from the direction of arrow 1 to the right side of the spread as shown in FIG. 5. The trace designated 2 would be the sum of the signals of the FIG. 8 record in the time delay combination shown in the dotted line 2, and the trace designated 3 would be the combination in the time-phase direction of the dotted line 3 of FIG. 8. In that no coherent energy is received from the direction designated by the arrow 1, the time delay combination represented by trace 1 of FIG. 9 illustrates no substantial energy. However, traces 2 and 3 of FIG. 9 illustrate coherent energy from the directions which correspond to their respective time-lagged combinations of the geophone signals or, stated differently, they display the directionally included information contained in the original seismic record from the geophones now connected as an array. It should be understood that there would be several separate traces separating traces 1, 2 and 3, with each trace being a different summation combination of the multitrace record of locational seismic traces. The strong signal shown on trace 3 would therefore appear on adjacent traces at lesser amplitudes as the sensitivity lobe of the geophone array was swept past the true direction of the reflector causing the energy arriving in the direction of arrow 3.

When an entire record as illustrated in FIG. 13 has been processed in the manner of FIGS. 5–9 with the beam or sensitivity lobe of the geophone array moved in the selected number of steps in accordance with the foregoing analysis, a plurality of individual directional seismic traces will have been produced with a separate trace for each of the selected steps of directionality for the geophone array. These separate traces may be collected into a full record and may be displayed as parallel traces in the manner illustrated in FIG. 14 and hereinafter called a "sonograph record" following the nomenclature established by Rieber. The sonograph record itself may be useful over and above the conventional seismic record. Perhaps the best present use to which an unmodified sonograph record may be put is that of aiding a seismologist in the picking of a conventional record. It is sometimes possible to see certain events on the sonograph record that do not stand out clearly enough on the conventional record to permit confident picking.

The present invention comprises modifying, improving, and transforming the sonograph record into other forms more useful than either or both of the former conventional or sonograph record forms. For example, one very useful transformation of the sonograph record is that in which the locational traces are plotted not as parallel traces along a rectangular strip but as diverging traces emanating from a reference point, which point represents a location at or near the location of the geophones on the earth's surface, the diverging traces proceeding downward and sideward, each trace proceeding in a varying and different direction from its diverging neighbor traces, the directions corresponding to the estimated actual directions taken by the respective seismic wave ray paths in the earth. The display thus produced will be called herein a migrated display of directional seismic traces.

As stated earlier, after a seismologist has picked and timed the reflection events recorded in a seismic survey, he normally plots them to a suitable scale, attempting to place them in their proper relative spatial positions in order to achieve a migrated seismic section wherein the geometry of the rock strata is indicated in true proportion. Seismologists commonly carry out the plotting operation with the aid of a wave-front chart such as that described in Exploration Geophysics, J. J. Jakowsky, 1950, Trija Publishing Company, Los Angeles, California, page 685 et seq. A wavefront chart is a graphical plotting aid which, in effect, summarizes all of the computations required to determine the spatial positions of a reflecting interface from a knowledge of the reflection time and the moveout of its resulting reflection event. It consists of two sets of curves, orthogonal to each other, one set of which represents the ray paths traversed by energy progressing outward from the shot point, while the other set represents the successive positions of the wave-front surface as it moves forward through the earth. These sets of orthogonal curves are superimposed upon a Cartesian system of coordinates whose horizontal and vertical scals represent, respectively, offset and depth in the earth relative to a given reference point. Thus, a wave-front chart provides a graphical means for converting knowledge of an event's reflection time and moveout, obtained from a seismic recording, into knowledge of the depth and offset in the earth of the geological feature which gave rise to the event. The construction of a wave-front chart is based upon Snell's Law and a knowledge of the velocity distribution within the earth. The computational procedures are well known to those skilled in the art and have been summarized in the literature, as for example, by H. Kaufman, Velocity Functions in Seismic Prospecting, Geophysics, volume 18 (1953), page 289 et seq.

All normally incident reflection energy exhibiting a given moveout on a seismic record will have followed the same ray path; or, stated differently, the specification of the moveout of a reflection event uniquely determines on the appropriate wave-front chart the particular ray path traversed by the corresponding seismic energy. Similarly the specification of an event's reflection time uniquely determines the particular position occupied by the wave front when it was tangent to the reflecting interface that gave rise to the recorded event. Therefore, given the moveout and reflection time of a particular event, a seismologist normally plots the spatial position of the reflecting interface by first finding the point of intersection of the ray path and wave front which correspond, respectively, to the given moveout and reflection time, and then drawing through the point a line segment, or dip bar, which is perpendicular to the ray path at that point. This dip bar constitutes a graphical representation giving the true dip, depth, and offset, to scale, of that portion of the reflecting interface which gave rise to the reflection event observed on the seismic record. By plotting all other reflection events in like manner, the seismologist constructs a migrated seismic section showing the subsurface geometry of the rock strata in true proportion. The construction of such migrated sections is costly, time consuming, and subject to various types of human error. Perhaps even more serious is the loss of information which results from representing the complex wave form found on the original seismic recording by a simple dip bar on the migrated section. Thus, in present practice, preservation of signal character is necessarily sacrificed in order to obtain a representation of the subsurface.

By means of the present invention, all of the above disadvantages are eliminated. The manner in which this is accomplished will now be described. As stated earlier, a locational record may be thought of as a plot of ground motion in a space whose coordinates are reflection time and geophone location. Through the beam steering process, the locational record is transformed into a directional record wherein ground motion is plotted in a space whose coordinates are reflection time and moveout. It will be noted that these coordinates are precisely the ones which are required for plotting with a wave-front chart. This being the case, the complete migration of the seismic data presented on a directional record can be achieved in principle simply by (1) placing each directional trace on the particular ray path of the wave-front chart which represents the moveout corresponding to the given directional trace, and by (2) distorting the reflection time scale of the directional trace to conform to the reflection time scale of the wave front chart. By so doing, a seismic data display has been achieved wherein ground motion is plotted in true depth and offset, relative to a reference point, at the location corresponding to the geologic feature which gave rise to that ground motion. In practice, one would not actually resort to the use of a wave-front chart as described above, but would, after the manner of the present invention, generate the desired ray paths and reflection time base as required by the plotting device, by electrical, electromechanical, mechanical, or optical means, or some combination thereof.

PLOTTING

The migrated display of seismic data in the form of directional seismic traces may be considered as a ray path plot of the seismic reflection data with each trace emanating from a reference point at the earth's surface. The most usual case would place the shot point from which the seismic energy is derived at the center of a geophone spread and would use the shot point as the reference point for the display. In less usual cases where the shot point will be spaced from the center of the geophone spread, the reference point will vary, and it may be shown mathematically that the reference point will be half way between the shot point and the center of the geophone spread.

Figure 16:
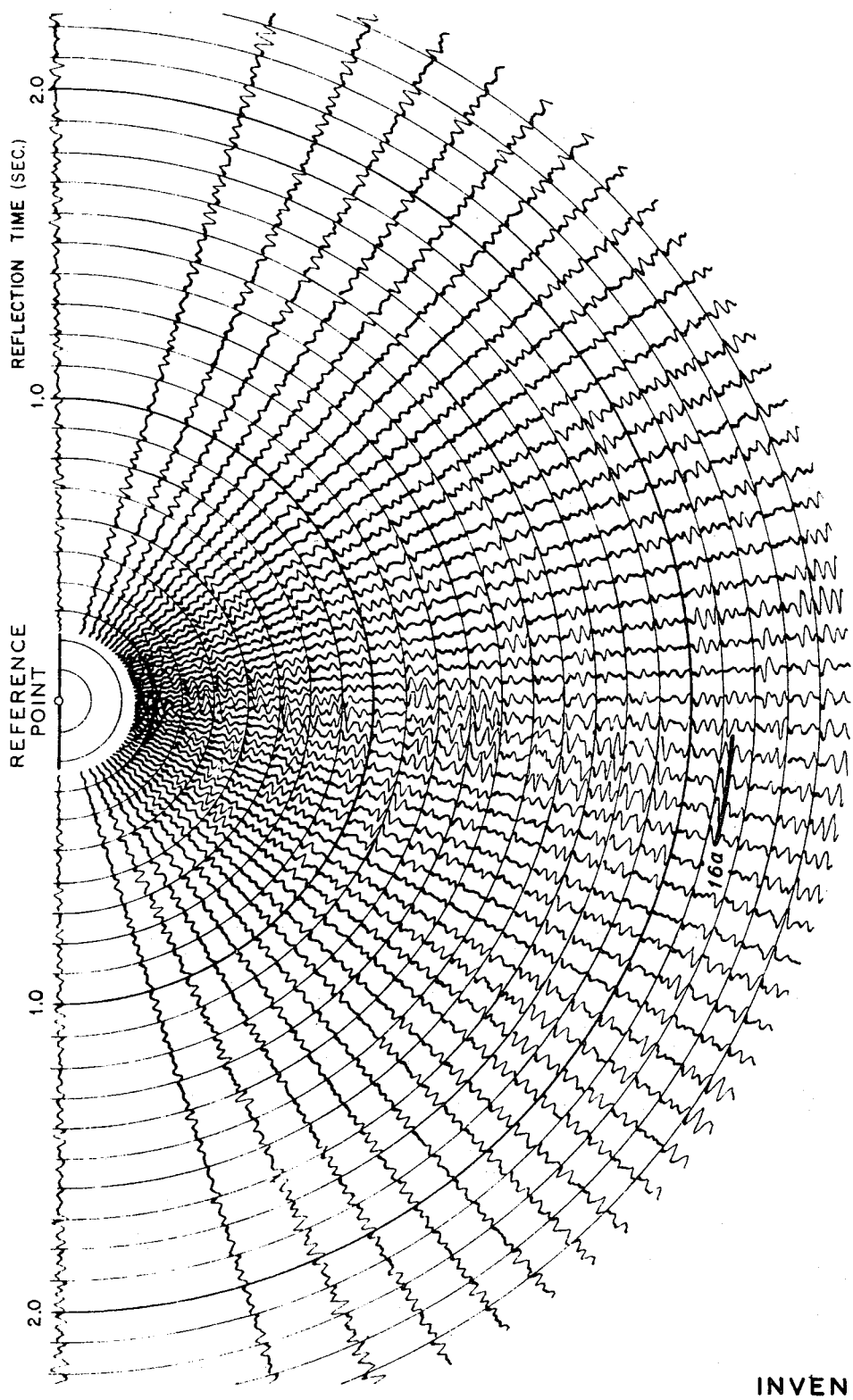
FIG. 16 is a migrated straight ray display of directional seismic traces.

FIG. 16 is a display of directional seismic traces in a straight ray migrated form. In this figure, each of the radial traces is plotted to appear to emanate from the reference point on a line on a display surface related to a datum surface within an earth formation and to begin its initial direction in accordance with the time lag employed in its production. The angle between adjacent traces may be mathematically stated as:

$$\Delta\theta \cong (1/\cos\theta) V/B) \Delta(\Delta t) \quad (1)$$

where V is the seismic velocity within the earth formations, B is the length of the geophone spread and $\Delta t$ is the time lag employed in combining the seismic signals within the locational seismic traces. If velocities are assumed to be constant and if a fixed incremental time lag is employed for each different set of signal combinations, the above equation may be reduced to:

$$\Delta\theta = (KT/\cos\theta) \quad (2)$$

where T is the dominant period of the seismic energy and where K is a constant combining fixed quantities from equation (1). As previously stated, the $\Delta t$ is related to the dominant period of the energy and will normally be within the range of 0.1 to 0.6 to T. Time lines in the form of arcs around the reference point may be used to show record time to any selected event while a selected event may be identified as by arcuate bar 16a. This arcuate bar is referred to as a dip bar and is related to subsurface coverage on a reflector in the position where it is drawn. The subsurface coverage is related to the length of the geophone spread at the earth's surface.

The plotting of directional seismic information produced in the hereinbefore-described manner may be further improved if, in addition to spatial direction plotting, the individual traces are caused to follow the precise ray paths of seismic energy, or at least a preselectd interpretation of the ray paths as derived from known or assumed seismic velocity variations within a geologic cross-section. Since seismic velocities generally increase with increased depth below the earth's surface and since acoustic waves are refracted as they pass from a stratum of one velocity into a stratum of a different velocity, the seismic ray paths are probably never in true straight lines as shown in FIG. 16 but are more likely in curved ray paths like those of FIG. 18. In this migrated seismic section display, each of the individual directional seismic traces is plotted to emanate from a reference point at the earth's surface and to travel, at least initially, into the earth's subsurface in accordance with the differential time lag employed in its production. As the trace continues into the subsurface formations it is made to curve in accordance with the seismic velocity information either known or presumed for the strata comprising the formations.

The direct plotting of the directional seismic traces derived from the foregoing processing of a seismic record constitutes an important feature of the present invention in that the direct plotting of seismic data in migrated form has heretofore been unknown. In the manner herein suggested, these directional seismic traces may be directly displayed as a migrated cross-section in either the form of FIG. 16 or FIG. 18. The present invention further provides for the complete automatic plotting of this information directly from the reproduction of the original seismic record.

Figure 4:
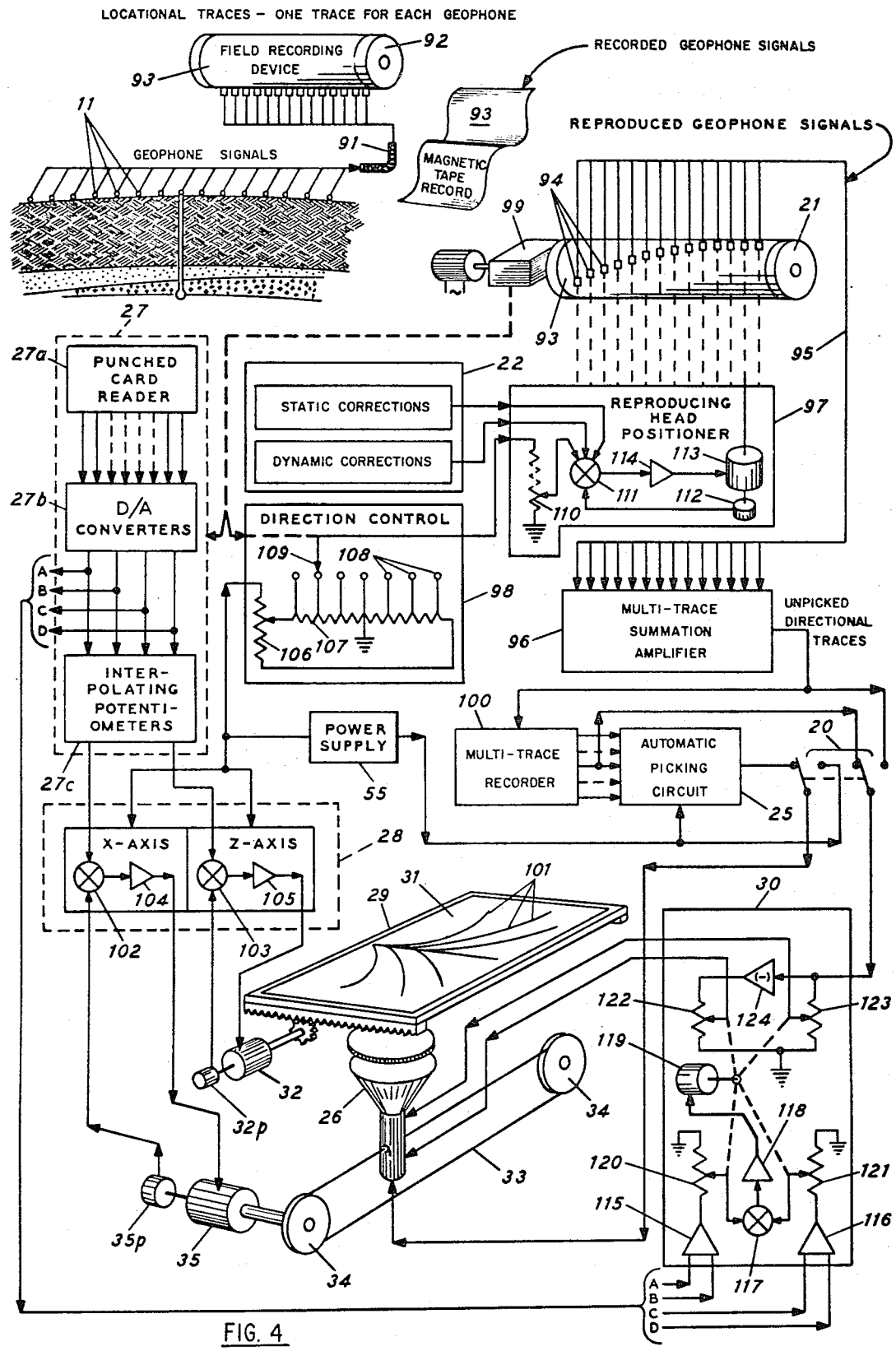
FIG. 4 is a block diagram of an apparatus for automatically plotting seismic information in the method of the present invention.

One form of apparatus for performing the method of the present invention is illustrated in FIG. 4. In this figure a cross section through an earth formation similar to that of FIG. 1 is shown in the upper lefthand corner. A series of geophones 11 is illustrated at the surface of the earth formation. Individual geophones are connected through a cable 91 to a field recording device 92 where the signals from each geophone are recorded as separate locational traces on a recording medium constituting a part of the field recording equipment. The recording medium is preferably a reproducible magnetic tape 93 here shown in three positions: first positioned on the field recording device 92, then removed from the device and then positioned on a record reproducer 21. In these three positions the field record 93 is shown as it is recorded, as it is transported to an office analysis location, and as it is positioned in the office analysis record reproducing equipment.

In accordance with the method of the present invention, the individual traces of the field record are reproduced by reproducing heads 94 at the reproducer 21 and the instantaneous signals reproduced by all heads are transmitted through a cable 95 to a multitrace summation amplifier 96 where the instantaneous signals are algebraically summed to produce a sum of the signals across the record. This summation produces a trace of information appearing across the record, which trace is here referred to as an unpicked directional trace. The individual reproducing heads 94 are positioned by a reproducing head positioner 97 in accordance with several independent pieces of adjustment information. Two of these pieces of information are the necessary adjustments to the positions for the individual heads to apply the static and dynamic corrections to adjust the field record for geophone position with respect to a datum plane within the earth and for the relative position of the several geophones with respect to each other and to the shot point. The introduction of these corrections is well known to those familiar with the seismic data processing art. The technique of determining these corrections is described in Exploration Geophysics, Second Edition, J. J. Jakosky, 1950, Trija Publishing Co., Los Angeles, California, at pages 716–728 and one method and apparatus for applying these corrections is illustrated in U. S. Pat. No. 2,841,777, F. G. Blake et al. issued July 1, 1958, for "Method for Compensating Seismic Detector Signals for Intersignal Time Variations."

The individual reproducing heads 94 are also positioned with respect to each other so that information appearing in the individual traces of the tape record 93 and representing reflections arriving from particular angular directions to the geophone array will be reproduced in an additive manner. For this purpose the heads are advanced in uniform succession as indicated in FIG. 4, each head being advanced by an additional circumferential increment with respect to its leftward neighbor. This of course gives the same effect as would be obtained if the record were laid out flat instead of around a drum and if the traces were sampled along a straight line across the record at an angle with respect to the time axis. In the method of this invention the successive circumferential incremental head displacements are changed for each revolution of the reproducer 21 so that successive revolutions cause the summation trace information to represent successive angular increments across the seismic record. The different angles in turn represent different angles of arrival of the original recorded seismic information. For purposes of this explanation it is convenient to think of the different head settings on reproducer 21 as representing different "emergent angles" of seismic energy, the emergent angles being the angles to the vertical from which the seismic energy seemed to come to the surface as it impinged upon the geophone array.

In the present invention the different head settings for the different emergent angles are accomplished by the head positioner 97 in accordance with adjustment information from a direction control 98. Direction control 98 includes apparatus that is set in accordance with the range of emergent angles that are to be searched in processing the record 93 and the number of increments within that range.

To accomplish that function the direction control 98 is supplied with a potential as from power supply 55 and that potential is impressed across a potentiometer 106 that is adjustable to determine the total angle through which the heads 94 are to be moved. The voltage derived from the potentiometer 106 is proportional to the range of emergent angles to be searched. The voltage derived from potentiometer 106 is supplied to a resistor 107 having a number of taps 108 between equal incremental resistances. The number of taps on the resistor 107 determines the number of equal portions into which the whole range of emergent angles is to be divided. Each tap is connected to a terminal and a slideable contact 109 is movable in steps to engage each terminal in sequence. At each terminal a voltage will be produced that will represent the analog of the position of a head 94 on the reproducer 21. That voltage is supplied to the head positioner 97.

The head positioner 97 constitutes a plurality of devices, one for each head 94, to accomplish the desired location of each head around the periphery of the reproducer 21. This is accomplished by supplying the direction control voltage from slideable contact 109 to a potentiometer 110 where the control voltage is divided into as many pieces as there are heads to be positioned. The individual pieces are supplied as one input to an error detector 111 along with the static and dynamic control signals in a similar form. Into the other input terminal of the error detector 111 is fed a voltage from a potentiometer 112, which voltage is an indication of the position of the shaft of a motor 113, and, in turn, an indication of the position of a reproducer head 94. Any difference between the two input voltages fed into error detector 111 causes the output of error detector 111 to actuate power amplifier 114 which, in turn, actuates motor 113 until the error detector 111 no longer senses a difference between its input voltages. The head 94 will then have been appropriately positioned.

For each head 94 there will be a duplicate of the error detector 111, the potentiometer 112, the motor 113 and the amplifier 114. Each duplicated portion will receive a portion of the input signal from direction control 98 and each portion will determine the position to which that head is to be moved with respect to its neighbor to detect the information in the original record having a particular emergent angle. After each revolution of the reproducer 21 a new head position will be supplied and all heads will be moved to their new positions until all emergents have been searched.

It is recognized in theoretical geophysics that if the emergent angle of a seismic wave is specified and if the seismic wave velocity is known as a function of depth in the subsurface then the entire subsurface path may be calculated along which that particular seismic wave traveled. As a practical fact, the way in which the seismic wave velocity varies with depth is never known exactly but useful approximate variations can be assumed. The simplest type of velocity variation that can be assumed is a linear variation, with the seismic wave velocity increasing as a linear function of depth. This type of variation gives rise to curved ray paths 101 of the sort indicated in FIG. 4. (Numerical computation of curved ray paths under the assumption of linear velocity variation is described in "Seismic Prospecting for Oil" by C. H. Dix, pp. 143 to 149, Harper, N.Y., 1952.) It is along the general direction of such ray paths that the oscillatory data picked up by heads 94 are to be plotted. So in the plotting of the data, it is necessary to generate the curved paths 101, at the same time that data are being transmitted from heads 94, through the intermediate apparatus shown in FIG. 4 to the deflecting circuits of cathode ray tube 26.

Several different forms of ray path generator could be designed for producing ray paths 101. The particular kind of ray path generator 27 indicated schematically in FIG. 4 was the kind actually used in an early embodiment of the present invention.

Ray path generator 27 includes a punched card reader 27a, capable of sensing the holes on a standard punched card. A different card is selected, either by hand or by automatic selection in accordance with signals from reproducer shaft sensing control 99, and inserted into card reader 27a for each different setting of the heads 94, and therefore, correspondingly, for each different emergent angle of the ray paths 101 to be plotted. The punched holes on any one card represent, say, 40 different values of the horizontal coordinate $x$ and 40 correspondingly different values of $z$, so that together they represent 40 points along one of the ray paths 101. Consider only one of the coordinates at a time, say the x-coordinate. The punched card reader receives a signal signifying the angle of rotation of drum 21 and therefore signifying the wave travel time represented by that angle of rotation. The time signal may be either a mechanical position signal or an electrical signal representing the angular rotation position of the shaft of the reproducer 21. The wave travel time determines what part of the punched card is to be read. As indicated hereinbefore, the card carries 40 sets of holes for the x-coordinate corresponding to 40 discrete time values. At any given actual time, not precisely equal to one of those 40 discrete values, the card reader is sensing at least two groups of holes, one set corresponding to the discrete time earlier than the actual time, and the other corresponding to the discrete time later than the actual time. The two sets of holes are transformed into two voltages by digital-to-analog converters 27b and these voltages are applied to the proper taps on one of two 40-tap interpolating potentiometers 27c, each of whose taps corresponds to one of the 40 discrete time values represented by the sets of holes in the cards. The arm of the interpolating potentimeter, as it moves along the potentiometer windings at a uniform rate (corresponding to the rotation rate of drum 21) senses a voltage intermediate between the voltages at the taps spanning its particular position, and as the potentiometer arm moves the voltage therefore varies in an effectively continuous manner, always smoothly interpolating between the voltages applied to its taps by the digital-to-analog converters 27b.

In one embodiment of the present invention, three sets of x-holes could be sensed by the card reader simultaneously, and three sets of z-holes could also be sensed simultaneously. Correspondingly, there were three individual digital-to-analog converters applying voltages to the x-interpolating potentiometer and three individual digital-to-analog converters applying voltages to the y-interpolating potentiometer. This six unit arrangement ensured that the interpolating potentiometers would always be activated at least one tap ahead of the arm position, and usually two taps ahead.

The ray path generator 27 thus supplies continuously two voltages, one of which is proportional to the desired x-coordinate, and the other of which is proportional to the desired z-coordinate of a ray path. The voltages themselves may be called, for convenience, simply, the x-voltage and the z-voltage. These voltages are now used to determine the motions of the plotting apparatus.

The x-voltage and the z-voltage are fed to the plotter control 28 which contains two error-detectors, 102 and 103, and two amplifiers, 104 and 105. Considering again, just the x-coordinate, the x-voltage coming from the ray path generator 27 goes to one of the input terminals of error-detector 102. Into the other input terminal of error-detector 102 is fed a voltage from potentiometer 35p, which voltage is an indication of the position of the shaft of motor 35, and in turn an indication of the x-position of cathode ray tube 26. Any difference between the two voltages fed into error-detector 102 causes the output of error-detector 102 to actuate power amplifier 104 which in turn actuates motor 35 until the error-detector 102 no longer senses a difference between its tow input voltages. Then, by rotating pulleys 34 and moving cable 33 the cathode ray tube 26 must necessarily be in the proper x-position.

In an exactly similar manner, the z-voltage fed into plotter control 28 energizes motor 32 and it establishes a voltage from potentiometer 32p to determine the z-position of the plotting board 29. Motor 32 causes the board to be moved by the rack and pinion drive mechanism.

Figure 18:
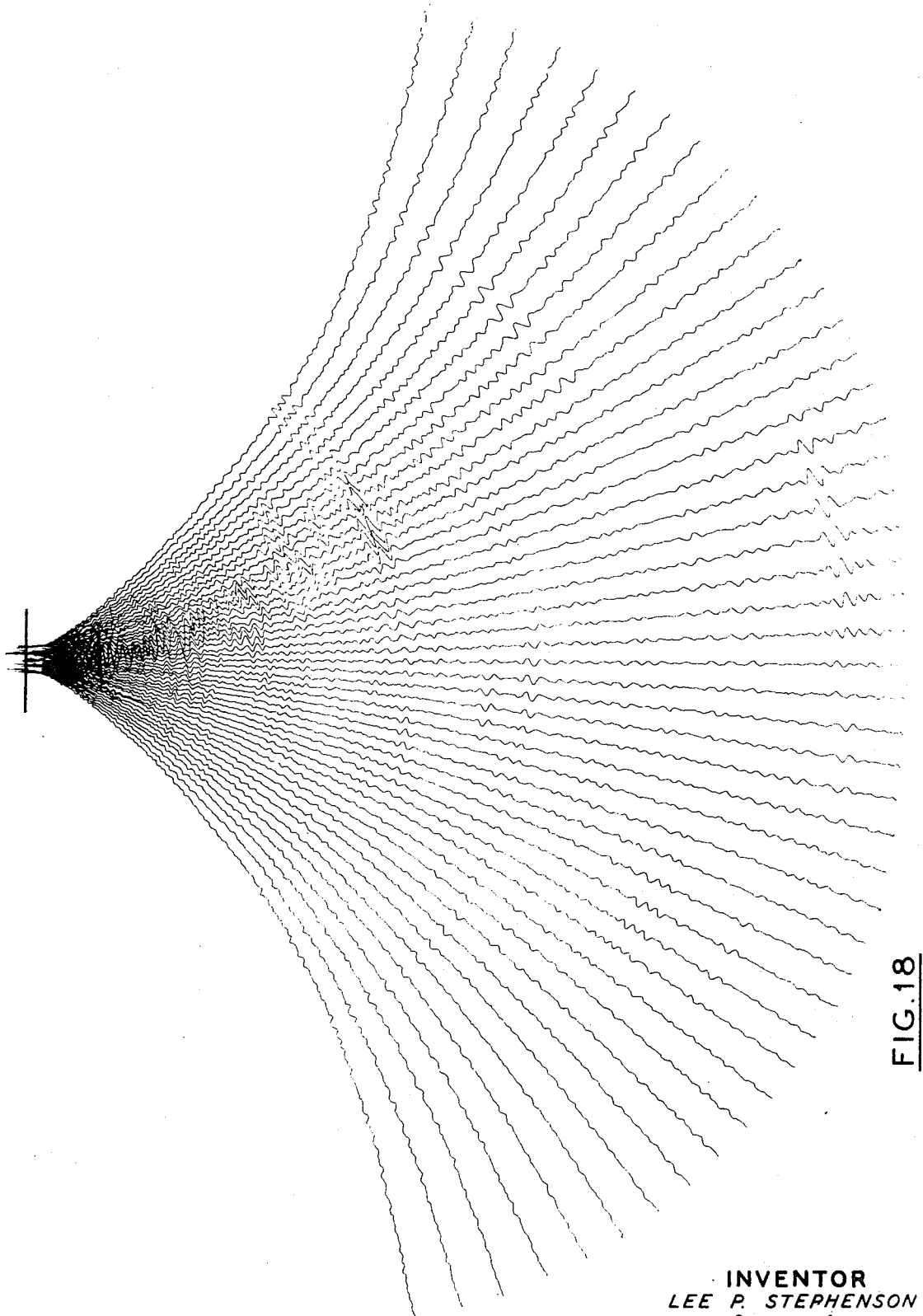

Now it will be appreciated from the description hereinbefore and also from a visual inspection of FIG. 18, for example, that the smooth ray paths whose generation has just been described are still only the mean positions of the wiggly traces to be plotted. The spot on the end of the cathode ray tube whose image results in the wiggly trace must actually oscillate about the mean position of a generated ray path with an amplitude proportional to the voltage signal from the multitrace summation amplifier 96. The oscillatory deviation from the mean ray path, however, must be perpendicular to the direction of that path so the deflecting voltage cannot merely be supplied to one or the other set of deflecting plates in the cathode ray tube. The deflecting voltage must be separated into two components and supplied in varying proportions to the two sets of deflection plates of the cathode ray tube and the proportions must vary as the direction of the ray path varies. It can be deduced from inspection of FIG. 4 that the component of the deflection voltage that must be supplied to the x-deflection plates of the cathode ray tube is proportional to the cosine of the angle from the vertical of the part of the ray path in question and the component that must be supplied to the z-deflection plates is proportional to the sine of the same angle and the algebraic sign of the z component should be negative. Component voltages having this relationship are supplied by cathode ray tube deflection control 30 as will now be described.

It will be recalled that the digital-to-analog converters 27b read at least two sets of holes at a time for the x-direction and likewise for the z-direction, and they emit two voltages for the x-direction and two for the z-direction. It can now be appreciated that the ratio of the difference of those two x voltages to the difference of those two z voltages is a tangent of the angle from the vertical of the part of the ray path in question. The two difference voltages may therefore be used to derive the desired components of the deflection voltage as follows. Referring to the parts inside cathode ray deflection control 30, the x difference voltage from digital-to-analog converters 27b is fed into differential amplifier 115 and the z difference voltage from digital-to-analog converters 27b is fed into differential amplifier 116. Potentiometer 120 is a cosine potentiometer out of which comes a voltage proportional to the cosine of the x difference voltage. Potentiometer 121 is a sine potentiometer out of which comes a voltage proportional to the sine of the z difference voltage. These two voltages are fed into error-detector 117 which actuates motor 119 to move the common potentiometer shaft until these two output voltages are equal. At this point it can be appreciated that the angular displacement of the common potentiometer shaft must be proportional to the angle from the vertical of the part of the ray path in question.

Now the deflection voltage from multitrace summation amplifier 96 is fed directly into cosine potentiometer 123 and through inverting amplifier 124 into sine potentiometer 122 and both of these potentiometers are coupled to the same shaft as were potentiometers 115 and 116. It can be seen that out of the arm of potentiometer 123 will come a voltage proportional to the cosine of the angle from the vertical of the part of the ray path in question and out of the arm of potentiometer 122 will come a voltage proportional to the sine of the same angle but the algebraic sign of this component will be negative. These voltages are therefore exactly the desired component deflecting voltages mentioned above. The voltage out of potentiometer 123 is applied to the x-deflection plates of cathode ray tube 26 and the voltage out of potentiometer 122 is applied to the z-deflection plates of cathode ray tube 26. It should be recognized that the circuits illustrated within the deflection control 30 have been simplified and have been specifically described only for the plotting of curved rays in the right-hand half of the display of FIG. 18. To accomplish the display in the left-hand half, the x-difference voltages will be negative and must be inverted as an input into differential amplifier 115 to provide the appropriate output signal. Likewise, the inverting amplifier 124 must be removed from the circuit, by suitable switching, for plotting in the left-hand half of FIG. 18.

AUTOMATIC PICKING

Each complete revolution of the reproducer 21 produces a new directional trace. These traces may be fed directly to the oscilloscope 26 or to the oscilloscope through an automatic picking circuit 25. If automatic picking is to be accomplished a multitrace recorder 100 must store the necessary traces for comparison in the following automatic manners. Switch 20 provides for direct plotting or plotting of automatically selected events only.

It has been found that when a seismic record is processed to produce directional seismic traces, these traces may be inspected for significant events by certain machine methods using simple criteria for the selection of events. In the simplest case, a machine may be instructed to select merely those wiggles on the record that have more than a certain preselected amplitude. More useful criteria, having deeper theoretical significance, are comparison criteria according to which individual traces are compared with their immediate neighbors, or their near-but-not-immediate neighbors, or both, to find those wiggles that correlate between neighbors. Correlation criteria may be specified in terms of relative amplitudes and/or in terms of time coherence.

When once such criteria as these are mentioned, it is natural to ask why they were not useful before now in machine methods that would have picked conventional seismic records, which were in the locational rather than the directional form. A complete answer to this question is unknown, but some partial answers can be given on both theoretical and experimental grounds.

It is known that people who are skilled in the picking of conventional, locational records do not use such a simple picking criterion as a merely outstanding amplitude on a trace. Amplitude anomalies on individual traces of conventional records can be meaningless manifestations of noise. Instead of an amplitude anomaly per se, an experienced record picker looks for events on individual traces that seem to correlate with events on the neighboring traces. It is sometimes more important that the correlating events have similar shapes than it is that they have outstanding amplitudes.

Part of the reason that an amplitude criterion is more useful on a beam-steered, directional record is that the trace-to-trace correlation has already been made in the beam steering process itself. Those events that appear to be of outstanding amplitude on a beam-steered record appear that way because a significant fraction of the original traces contained those events. To summarize briefly, the amplitude criterion applied to a beam-steered record is, in a sense, already equivalent to a correlation criterion applied to a conventional record. However, it should be definitely understood that this is not the entire reason that amplitude criteria and related criteria are more useful on beam-steered or directional records. The entire reason that directional records are more amenable to picking by simple criteria is not known. It may always remain unknown because seismic records are not susceptible to complete theoretical analysis. This is because there is no sharply definable distinction between the signal and the noise on a seismic record. So it may always remain mainly a fortunate discovery that certain simple picking criteria, simple enough to be contained in instructions to various sorts of machines, enable those machines to select meaningful events from beam-steered or directional seismic records. Methods in which those criteria may be employed are described in the following paragraphs.

For conventional records, typical criteria upon which the picking or selection of an event may be based are: trace-to-trace similarity, signal strength, signal character, or combinations of these criteria. With a conventional record, these criteria are normally applied by human inspection and with a high degree of subjectivity, with the result that different seismologists may disagree substantially in assessing the validity of a given event or in determining the number of valid events and their times of arrival. On the other hand, with a beam-steered record the application of picking criteria may be done automatically. For example, experiments have shown that if an absolute amplitude criterion alone is applied to a beam-steered record, the uneventful part of a record, which may amount to 80 percent of that record, can be eliminated with the remaining 20 percent of the record containing all of the geologically significant information that was included in the original record. Because this form of selectivity requires that the signals within a record must exceed a particular absolute amplitude, it will be referred to as the absolute amplitude picking criterion.

Amplitude picking may be applied in another manner to provide a further selectivity for information within the record. If each beam-steered trace is compared to its neighboring traces or near-but-not-immediate neighboring traces for signal strength and is required to exceed the strength of neighboring trace signals before it is picked, it is then possible to select the direction along which a reflection has come from a reflecting horizon. Inasmuch as this form of selectivity depends upon the relative amplitudes of a signal as it appears on adjacent traces of the beam-steered record, it will be referred to as the relative amplitude picking criterion.

A third type of criterion that may be applied to the directional traces is a time-coherence criterion. By this is meant that three or more traces are compared to see if the peaks and valleys (crests and troughs) of their respective signals occur at approximately the same time. It is important to recognize that in actual practice one can hardly expect even the most meaningful peaks and valleys to occur at exactly the same time on several traces. This is often a result of interference between events and of imperfections in the geophones and all their associated equipment. So one does not expect to see exact coincidence of the peaks and valleys of sets of waves on neighboring traces, although one does expect meaningful events to show a certain minimum time coherence. For instance, one may see a promising portion of a record in which the peaks in a particular trace do not lag or lead similar peaks on the neighboring traces by more than one-eighth of the dominant period of that part of the signal. It could then be said that the time coherence is about one-eighth of a period. Later in this specification, a system will be described in which automatic picking is performed using a quantitative time-coherence criterion which, if desired, may be expressed in terms of a small fraction of a period. At this point, however, a weaker time-coherence criterion will be described which amounts to a requirement that the peaks of three neighboring (or near-but-not-neighboring) traces were within a half period of each other.

It has been found that by applying the three criteria mentioned above, absolute amplitude, relative amplitude and time coherence, the total information content of a seismic record may be reduced to, say, 4 per cent of that of the original record, and this remaining 4 percent will still contain all of the geologically significant information in the original record.

Figure 10:
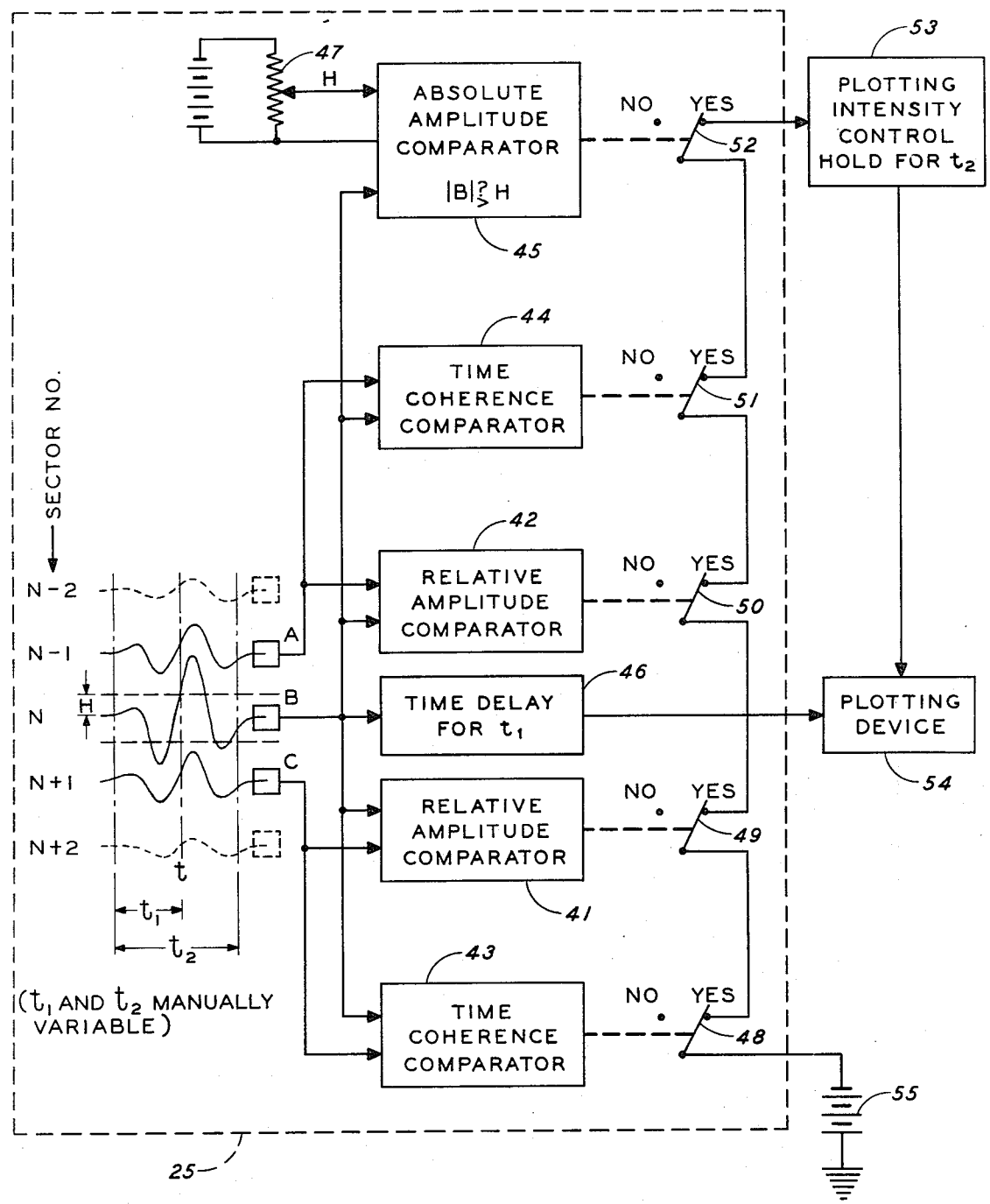
FIG. 10 is a block diagram of an apparatus for automatically picking seismic data.
Figure 11:
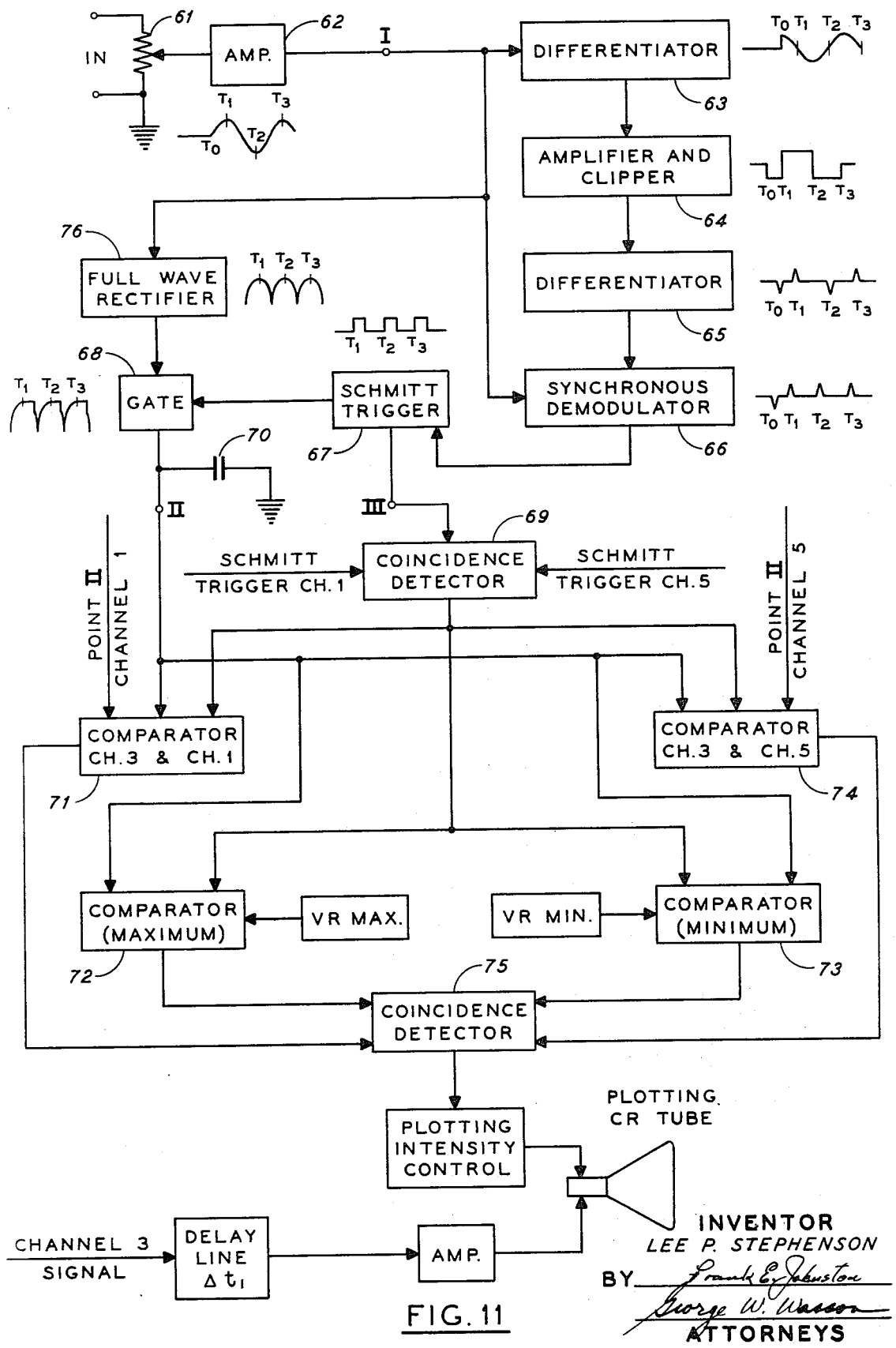
FIG. 11 is an alternative form of an apparatus for automatically picking seismic data.
Figure 12:
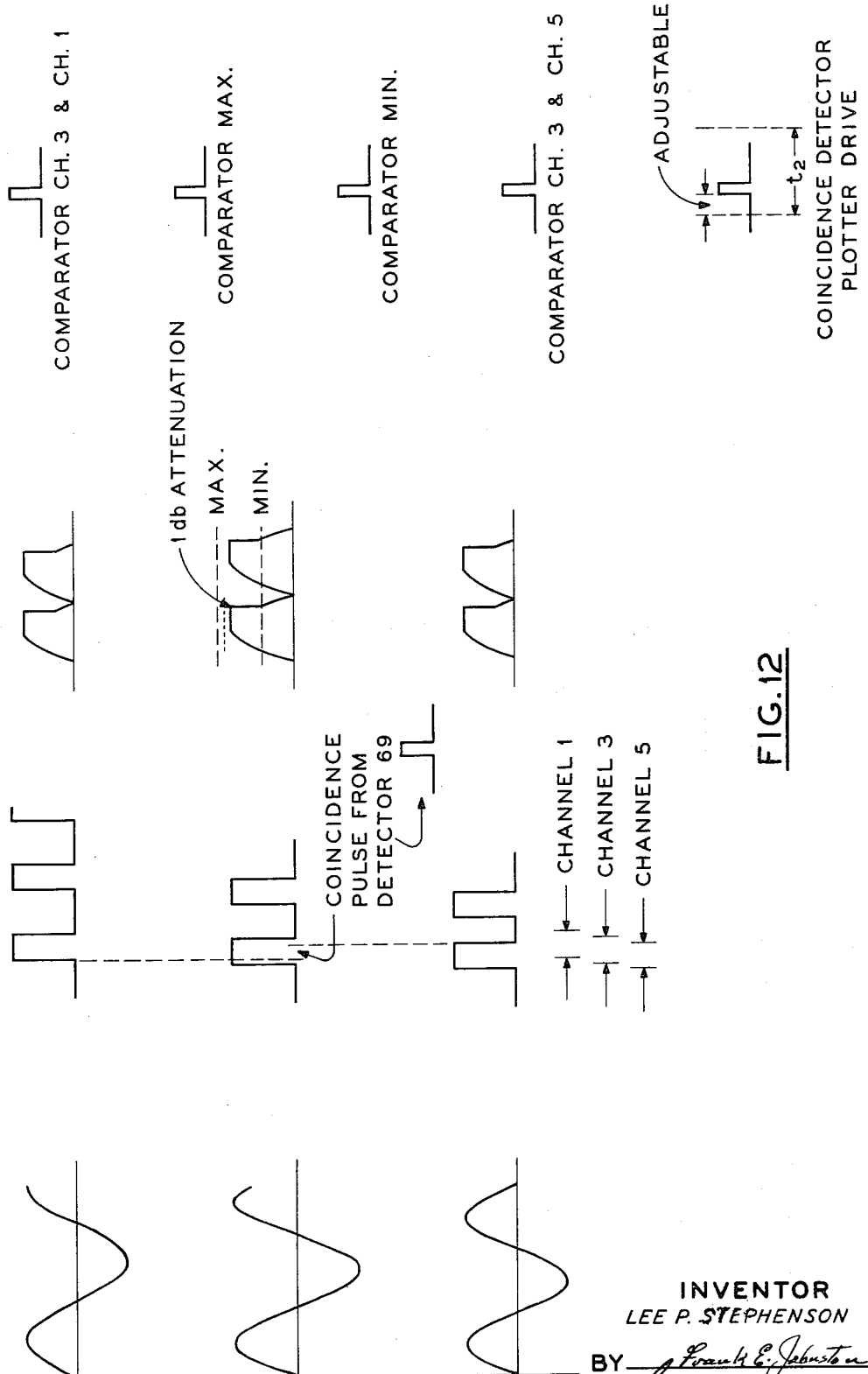
FIG. 12 is a series of wave form diagrams related to the automatic picking apparatus of FIG. 11.

The criteria defined above for the picking of a beam-steered record may be applied with automatic processing apparatus, in sharp contrast to the manual picking that is customarily applied to a conventional record. As indicated in FIG. 3, a legitimate event will appear on approximately five adjacent traces of the beam-steered record, varying from half amplitude to full amplitude and back to half amplitude, provided that the beam steering time interval is approximately 0.3 of the dominant period of the seismic signal as described earlier. By processing the record to apply amplitude or strength criteria both singly and comparatively, as well as time coherence criteria with a preselected number of adjacent traces, a beam-steered record may be automatically picked to permit plotting or display of only meaningful seismic events. FIGS. 10 and 11 illustrate schematically two alternative forms that an automatic picking circuit may assume for the performance of the processing method in the present invention. For the purposes of simplicity of description, the processing system as herein illustrated, is confined to the processing of three beam-steered records or traces rather than the five traces indicated from consideration of the directivity patterns of FIG. 3. In the circuit illustrated in FIG. 10, the central trace is designated N, and traces above the central trace are designated $N-1$ and $N-2$, while traces below the central trace are designated $N+1$ and $N+2$. The analysis is of the traces N, $N-1$, and $N+1$. The circuit of FIG. 10 continuously applies three criteria to the picking of the record for display purposes. These criteria are first, an absolute amplitude criterion established by the level designated H on trace N, a relative amplitude criterion whereby trace N is compared to traces $N-1$ and $N+1$, and a time coherence whereby the algebraic signs of two pairs of signals are compared, and the sign agreement intervals are then compared for coincidence. For the purposes of the schematic illustration, three separate reproducing heads are designated A, B, and C, by which the signals of the separate traces are reproduced. The outputs of the separate pickup heads are applied to comparator circuits indicated in FIG. 10 for the automatic decision of whether the information should be plotted by the plotting device on the display surface of FIG. 4. These circuits include a pair of relative amplitude comparators 41 and 42, a pair of time coherence comparators 43 and 44, and an absolute amplitude comparator circuit 45. Five separate switches 48, 49, 50, 51 and 52 are individually actuated by the five separate comparator circuits to implement the decision made by the picking circuitry. The switches 48 through 52 provide for an interruptable connection between a voltage source 55 and a plotting intensity control 53 so that, if all of the series switches are in a closed position, the plotting intensity control 53 will be provided with a voltage for actuation of a maximum plotting beam intensity. The inputs to the absolute amplitude comparator 45 are the signal from the beam-steered record trace being processed and the output from a voltage divider network 47. The absolute amplitude comparator 45 applies the acceptance level H for a signal and therefore selects signals by an absolute amplitude criterion. Comparator 45 may also provide for rejection of signals that exceed a maximum level since such signals are sometimes not desired. The relative amplitude comparator circuits 41 and 42 compare the average amplitude of the signal picked up by the head B with the average amplitudes of signals picked up by heads A and C and constitute conventional comparator circuits. Comparator circuit 41 controls switch 49 to move the switch to a "yes" position if the signal from B is of a higher amplitude than the signal from C, and comparator circuit 42 provides similar control of switch 50 if the signal from B is larger than the signal from A. Comparators 41, 42 and 45 may constitute conventional comparator circuits and therefore require no specific circuit description.

The time coherence comparators 43 and 44 compare the two signals that enter them and cause their respective switches 48 and 51 to assume the yes position when the entering signals have the same algebraic sign. Each of these time coherence detectors may comprise, for example, an amplifier and clipper pair for each of the two input signals to produce square waves having the same time axis crossover points as the entering signals, these square waves having identical amplitudes. The square waves may then be passed through a full wave rectifier. It will be appreciated that such an arrangement will produce square output pulses corresponding to the time intervals when the two input signals have the same sign, whether that sign is positive or negative. The square output pulses control the switches 48 and 51.

The description has now covered the application of the picking criteria, which determine portions of the signal to be plotted with maximum intensity. But it will be appreciated that in those parts of a seismic record where portions are found that satisfy the criteria, those portions are only fragmentary. That is, they will consist only of portions of the peaks and troughs of the signal. What is actually desired is not to examine just those fragmentary portions, but to examine all of each region of a trace in which portions are found that satisfy the criteria. It is desired to see the full cyclic excursions of those parts of the signal, of which only fragments satisfy the criteria. It is further desired to examine those full cyclic excursions within their context. That is, when an interesting portion of a trace is found by the picking criteria, it is desired to see what happened in the build-up period immediately before that portion, and what will happen in the tailing-off period after that portion. Therefore, provision is made to plot each trace continuously from a certain predetermined time interval ahead of any point that satisfies the picking criteria until another predetermined time interval after any point that satisfies the picking criteria.

Referring back to FIG. 10, the desired anticipatory effect is obtained by feeding the signal to be plotted through time delay 46, which delays the signal by an amount of time $t_1$. So when the sensing devices find a point on a signal trace that satisfies the picking criteria, and when they in turn actuate the plotting device to plot at maximum intensity, the plotter which is handling the delayed signal will actually begin to plot with maximum intensity at that point of the trace that is a time interval $t_1$ ahead of the picked point.

The plotting of tailing-off regions after picked points is accomplished by a holding circuit in the plotting intensity control. This holding circuit maintains maximum plotting intensity for a time interval $t_2$ after each and any actuation pulse. It can be readily deduced that $t_2$ must exceed $t_1$ by whatever time interval it is desired to use for looking at the trailing-off region.

An alternative form for the automatic picking apparatus illustrated in FIG. 11 performs the selection of seismic events in a different manner, even though the selection of the individual events is still based upon the application of the criteria of absolute amplitude, relative amplitude, and time coherence. The circuit of FIG. 11 constitutes one channel of the automatic picking apparatus, there being at least two other substantially similar channels required to process the signals from the neighboring traces. In the description of this alternative automatic picking circuit, the selection of events in a central trace of five traces will be described on the basis of a comparison of the first, third, and fifth of a suite of five traces, rather than the central and two next adjacent as was described with respect to the circuit of FIG. 10. It has been found that the use of these three channels is successful in practice, and it can be shown theoretically that the probability of missing a meaningful event is less when traces one, three and five are used than when traces two, three and four are used.

The input to the single channel shown in FIG. 11, which is to be considered as channel three of channels one, three, and five, is the directional trace from which events are to be picked. The signal is passed first through attenuator 61, which forms part of the relative amplitude selection system. The relative amplitude criterion is to be applied as follows: The signal on trace three is to be plotted at full intensity if its amplitude satisfies both of the following conditions: (1) it must exceed the amplitude of trace one, and (2) it must exceed the amplitude of trace five. The excess must be in terms of a ratio, which in practice is conveniently expressed in decibel terms. Actually, the circuit that follows attenuator 61 permits the signal of trace three to be plotted at full intensity if its resultant out of attenuator 61 just exceeds the other signals by a very small difference. This difference is zero for practical purposes, so it may be said that the test is substantially a test for equality. In order that this equality represent a decibel or ratio difference, the signal coming from attenuator 61 has been reduced by attenuator 61 to just the required fraction of its original value. The attenuated output is passed through amplifier 62 and through the differentiator 63 so that the peaks and valleys of the signal (crests and troughs) will appear in a more useful form as crossover points on the zero axis or as points where the signal goes from positive to negative. An amplifier and clipper 64 reverses the signal polarity and converts the differentiated signal to square waves as indicated in the schematic wave form diagrams in FIG. 11. The square waves go into differentiator 65 which produces positive and negative pulses at times corresponding to the crossover times of the square waves. At this point it will be understood that the positive and negative pulses coming from differentiator 65 correspond in time to the peaks and valleys of the signal that entered attenuator 61. The synchronous demodulator 66 compares pulses from differentiator 65 with the output of amplifier 62. When the sign of a pulse is the same as the sign of the signal from amplifier 62, the synchronous demodulator emits a positive pulse regardless of whether that pulse when it entered the synchronous demodulator was positive or negative. However, when the sign of the pulse is different from that of the signal from amplifier 62, the synchronous demodulator passes that pulse as a negative pulse. One object of the operation of synchronous demodulator 66 is to distinguish pulses that represent true peaks and valleys of the signal from pulses that represent sudden changes of the signal from a quiescent condition. Such a pulse is indicated in the schematic wave forms of FIG. 11 at $T_0$. Other objects of the synchronous demodulator will become apparent further on in this explanation.

The output from synchronous demodulator 66 is fed into the Schmitt trigger 67 that produces a square wave of predetermined duration, beginning at the time of a positive input pulse. It produces no output for a negative pulse. It will be appreciated that the predetermined duration of the square waves must be less than a half period of the dominant seismic frequency. The square waves from the Schmitt trigger are fed into the gate 68 which is polarized so that it is closed when the square wave is on, open when it is off. The impedances of the circuit including full wave rectifier 76, gate 68, capacitor 70, and the devices following capacitor 70, are such that when gate 68 is open, the voltage across capacitor 70 faithfully follows the rectified seismic signal. However, when gate 68 is closed, capacitor 70 maintains within, say, one per cent, the voltage it had at the instant of closure. But in accordance with the explanation heretofore, gate 68 closes precisely at times corresponding to the peaks and valleys of the seismic signal. Therefore, the absolute amplitude of each peak and valley is retained across capacitor 70 for the predetermined time interval established by the Schmitt trigger.

It is convenient at this point to return to the consideration of what happens in the other chanels of the system, those channels that process traces one and five. The circuitry in the first part of those channels is similar to that already discussed with two exceptions: (1) the input attenuator 61 is absent, and (2) the seismic signal input to the synchronous demodulators in channels one and five does not come from the channel one and five amplifiers but from the channel three amplifier. In other words, the seismic signal inputs of the synchronous demodulators of all the channels are connected to point I of channel three. The synchronous demodulators of channels one and five behave similarly to their counterpart in channel three, that is, they produce positive pulses from input pulses of either sign when those pulses agree in sign with the seismic signal on channel three. They produce negative pulses from input pulses of either sign when those input pulses disagree in sign with the seismic signal on channel three. Therefore, it will be appreciated that the respective Schmitt triggers in channels one and five will be actuated only when peaks in those channels occur within the time intervals during which the channel three signal is positive, or when valleys in those channels occur within the time intervals during which the channel three signal is negative. Because the later comparisons are to be made only during the Schmitt trigger intervals, this prevents a peak on one channel being compared to a valley on another. However, it still permits peaks on channels one and five to be compared with peaks on channel three even when they are shifted with respect to the peaks on channel three by as much as a quarter of a period.

If ideal seismic records were being processed, it would not be necessary to provide for the comparison of peaks or valleys that were as much as a quarter period apart. However, in actual practice, the effects of differential geophone placements, differential geophone responses, and other nonideal differential effects between the various information channels, reduce the coherence. During the processing of seismic records of good quality, it has been found that valid information may have a coherence as tight as a sixteenth of the dominant period. But during the processing of poor records, coherence as loose as a quarter period must be tolerated. In order that optimum amounts of noise may be rejected from records of various qualities, it is necessary to vary the coherence requirements. This variation is produced by varying the duration of the Schmitt trigger square waves.

From this point on in the description, it is to be understood that the three channels (one, three, and five) merge as indicated in FIG. 11. There is no more duplication of apparatus in separate channels after each of the channels goes as far as points II and IIIIN FIG. 11.

The outputs of the three Schmitt triggers are separately fed into coincidence detector 69. Detector 69 passes the coincident fraction of the square waves from the three channels. Because the starting times of the separate input square waves correspond to peaks, or valleys, in their respective channels, and because the operation of the synchronous demodulators has already insured that the waves from all three channels will represent either peaks, or valleys, but not both, a coincidence of the square waves must represent time coherence of three peaks, or of three valleys. Furthermore, that time coherence must be such that the time between the first and last peaks is at least as short as the Schmitt trigger time interval. As mentioned already, the time coherence to be expected in seismic records, for valid events, varies with the quality of the records, and in accordance with the empirically determined quality, the Schmitt trigger time interval may be shortened or lengthened.

If there is no output from coincidence detector 69 none of the remaining parts of the selection circuitry comes into play, and whatever plotting of the signal is occurring at the very end of the processing is occurring at minimum intensity, which minimum intensity may actually be zero. However, if there is an output from coincidence detector 69, it activates the various following devices that determine whether the absolute and relative amplitude criteria are satisfied.

Most of the remaining devices in the circuitry are comparators, all of which perform a similar type of function. They are four terminal devices. Into two of the terminals are fed two voltages to be compared. A third terminal, the output terminal, delivers a postive or negative pulse depending on which of the two voltages is greater, but the output pulse is delivered only when an interrogation pulse is sent into the fourth terminal. In the circuitry to be considered, the interrogation pulses are the already mentioned coincident fractions of square waves that come from coincidence detector 69.

Going back to capacitor 70, it will be recalled that the voltage at point II of each channel is held substantially constant at a peak maximum (or a valley minimum) voltage for the duration of each Schmitt trigger square wave. For convenience, let the point II voltages in channels one, three, and five be called V(II 1), V(II 3), and V(II 5) respectively. The voltages V(II 1) and V(II 3) are fed into comparator 71. If V(II 3) is greater than V(II 1), comparator 71 emits a positive pulse when interrogated by coincidence detector 69. Similarly, voltages V(II 5) and V(II 3) are fed into comparator 74. If V(II 3) is greater than V(II 5), comparator 74 emits a positive pulse when interrogated by coincidence detector 69.

Voltage V(II 3) is fed also into comparator 72 and 73. In comparator 72, V(II 3) is compared with a predetermined reference voltage VRMax. If V(II 3) is less than VRMax, comparator 72 emits a positive pulse when interrogated by coincidence detector 69. In comparator 73, V(II 3) is compared with a predetermined reference voltage VRMin. If V(II 3) is greater than VRMin, comparator 73 emits a positive pulse when interrogated by coincidence detector 69.

The outputs from all of the comparators 71, 72, 73, and 74 are fed into coincidence detector 75, which produces a positive output pulse only when it receives positive pulses from all four comparators. So, a positive pulse from coincidence detector 75 means that all criteria have been satisfied, namely that: (1) there is a predetermined time coherence between peak and peak or valley and valley on all three traces one, three and five, (2) the peak (or valley) voltage of trace three lies between a predetermined maximum and minimum, and (3) the peak (or valley) voltage of trace three exceeds the peaks (or valleys) voltage of both traces one and five.

As in the method previously described using the different apparatus of FIG. 10, it is now desired that the indication of satisfaction of the criteria be used to emphasize the corresponding part of the record being plotted. And as before, this does not mean that small, disconnected portions of the record, such as its peak regions and valley regions, are to be emphasized with respect to their surrounding cross-over portions; it means that when the criteria are satisfied, the entire trace in the neighborhood of the satisfying portions is to be emphasized. Furthermore, in order that the presumably significant portions of the record may be shown in context, it is desirable that the emphasized neighborhood extend both before and after the portions that satisfy the criteria.

As in the method previously described, the anticipatory effect of plotting ahead of the portions of the record satisfying the criteria is accomplished by feeding the channel three signal to the plotting tube by way of a delay line. The holding effect is accomplished by keeping the plotting intensity at its high level for a predetermined holding time after the last point of satisfaction of the criteria, which is manifested in a positive pulse out of coincidence detector 75.

The automatic picking circuits of FIGS. 10 and 11 may be incorporated into the plotting device shown in FIG. 4 between the reproducer 93 and the cathode ray tube 26 in block 25. Switch 20 may be provided to bypass the automatic picker 25 should it be desirable to plot all of the information contained in the directional traces as shown in FIGS. 14, 16 or 18. It will be understood that the data that do not satisfy the picking criteria may be treated in at least two ways. They may be completely suppressed, that is, not plotted at all as in FIG. 21; or, they may be deemphasized by some sort of fragmentary plotting, as with dotted or dashed lines, or by plotting with reduced intensity as in FIG. 23.

Figure 17:
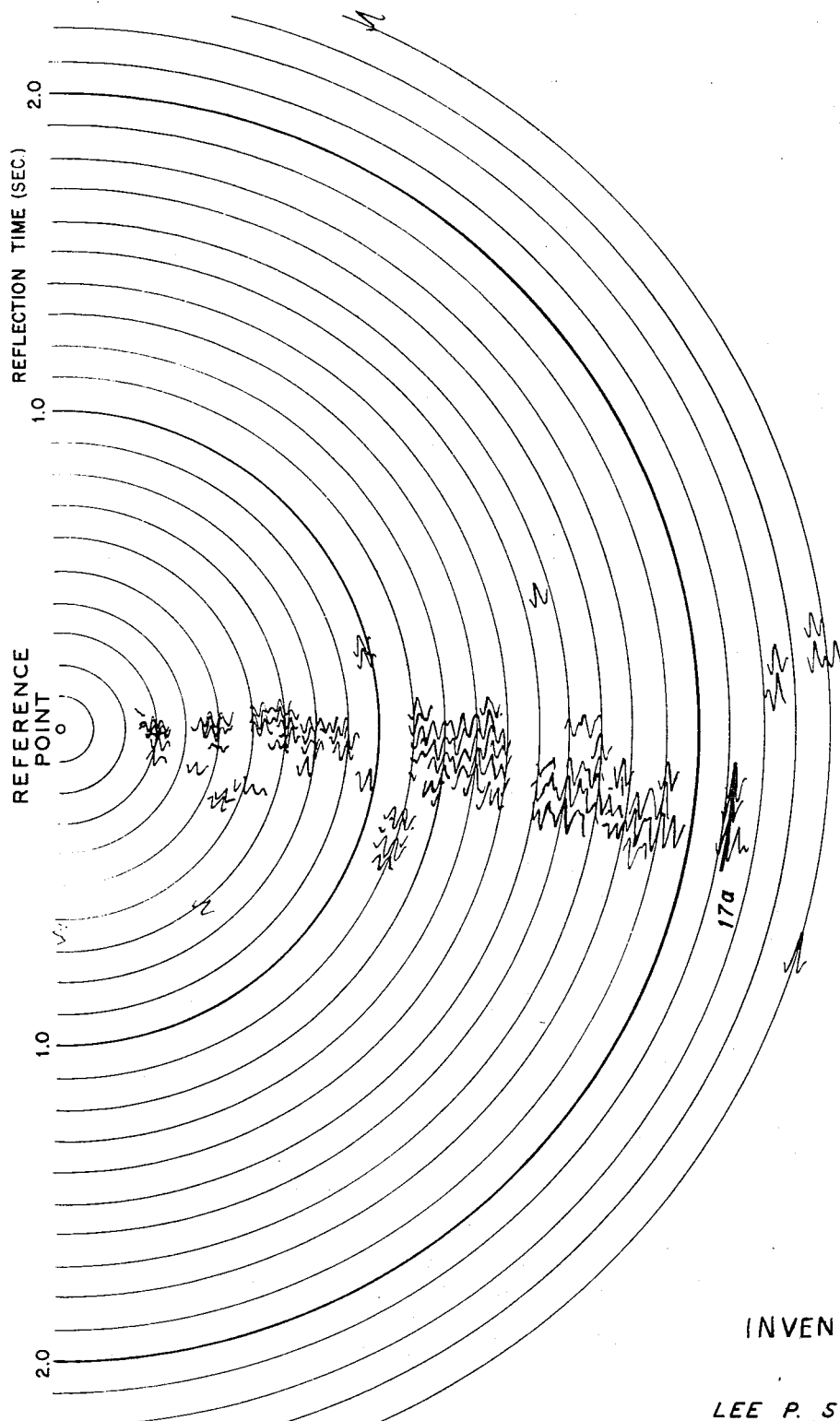
FIG. 17 is a migrated straight ray display of directional seismic traces with significant seismic events automatically picked and accentuated in predominance within the display.

Now that the record has been automatically picked by the application of the criteria shown in FIGS. 10 and 11 to each of the several traces of the beam-steered record to select only the valid signal events within the record, the record may now either be displayed in the sonograph form of parallel traces as shown in FIG. 17 or in the migrated form as shown in FIG. 19. FIG. 20 illustrates the advantage of the plotting of the directional seismic traces with automatic picking showing how relatively simply a geological formation may be superimposed upon the plotted seismic cross-section display.

Having processed the original seismic record in the manner of the foregoing description, it should now be apparent that it is possible to take the energy received at a multigeophone spread, to combine the energy in various time-delayed combinations, and to energize a plotting device that may be moved over a display surface in accordance with the elapsed record time, the known or assumed velocity distribution and the time-phase combinations of the signals to produce a direct display of reflecting horizons within the earth formation in their proper positions in depth, dip and horizontal displacement from a reference point usually representing the source of seismic energy. Such a display may be as is shown in FIGS. 16–21 wherein each of the various traces results from a different time-phase combination of signals in a conventional reproducible seismic record. The display in the manner of FIGS. 16–20 has required no manual picking of the records and no subjective interpretation of the data prior to migration, and is a true and complete spatial representation of the energy displayed on a conventional record.

FIGS. 13–21 forming a part of this specification are actual reproductions of the displays of seismic data as result from the plotting of original geophone records, the processing of original records to sonograph, the plotting of sonographs in migrated sections, and the plotting of the above sonographs after picking criteria have been applied to the signals therein. Each of these figures is an original record reduced to appropriate size for patent application drawings. The display, because of the size reduction, loses some of the detail that is present in the original record from which it was reduced. Exemplary of the display loss is the dotted character of the trace patterns between significant events in a display as shown in FIG. 19. The figures do, however, illustrate how the seismic data may be displayed and do illustrate how events may be exemplified within a seismic cross-section.

It should be further noted that the display of FIG. 15 illustrating the selection of events within directional seismic traces demonstrates only a partial application of picking criteria. It should be apparent that if full picking criteria were applied, as with the apparatus of FIG. 11, only one directional trace showing a picked event would be plotted. If the picking criteria were applied through neighboring traces and not adjacent traces, then perhaps two traces would plot the event. However, in no case would more than two traces plot an event. FIG. 15 does show plotting of events on more than two traces, namely at 15a–15e, and is actually a selection of events for plotting on absolute amplitude criteria only rather than the more stringent criteria of absolute amplitude, relative amplitude and time coherence before an event will be plotted.

FIGS. 22 and 23 illustrate the application of full picking criteria to a sonograph record. FIG. 22 is part of an unpicked sonograph record containing events of significance within the traces as shown. FIG. 23 illustrates only those events that remain after application of the picking criteria of absolute amplitude in minimum and maximum, relative amplitude between neighboring but separated traces and time coherence between neighboring but separated traces. The picking of the record shown in FIG. 22 was automatically performed with the circuit of FIG. 11; however, the record could have been picked with a circuit operating in the manner of FIG. 10. FIG. 23 also shown in greater detail the relative accentuation of the selected events with the retention of the remainder of the trace excursions in the form of interrupted plotting.

There are numerous forms that the actual display of the directional seismic data may assume. Each of the figures representing seismic displays have shown the data as oscillatory traces having events indicated by variations in amplitude of lateral oscillations spaced in time longitudinally along a trace. These events can be equally well displayed as variable density patterns along a trace, as dip bars (16a, 17a and 19a) representing subsurface coverage spaced in reflection time and moveout from the reference point, as a combination of both, or as portions of the original locational seismic trace record. All of these forms of display and others not mentioned are contemplated by the terms "seismic data" or "seismic traces" when used in the attached claims.

Another form of plotting display may be employed to provide a more comprehensible cross-section of an earth formation when a multispread seismic survey is to be plotted. In this form a combination of the plotting events selected on absolute amplitude only is combined with a plotting of events selected by the application of full picking criteria as with the circuits of FIGS. 10 and 11. A display of this type would combine a plotting of the type shown in FIG. 21 with the exacting plotting of events as shown in FIG. 23. The full display would then constitute a three-level intensity control applied to the plotting of the directional seismic traces; that is, where no events are evident the trace would be blanked out, where an event begins to build up along a trace a first or grey level of plotting could be employed, and where the event becomes strongly evident, a second or black level of plotting could be employed. To accomplish this plotting scheme, the circuits of FIGS. 10 and 11 would merely require an intensity control circuit actuated through the absolute amplitude comparator 45 or the comparators 72 and 73, of the two figures respectively, to initiate the first level of plotting while the entire circuits would operate as described for the second level of plotting. The second level of plotting would remain on only the appropriate neighboring events where the combining of locational traces establish the signal; however, whenever an event exceeds an absolute amplitude on the neighboring traces, it may appear in the plotted display to the sides, in front of, and behind the fully selected plotting of the event. Other modifications of the display of directional seismic traces either as a single-spread or as a multi-spread survey to accomplish the above feature should be readily apparent.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

I claim:

1. A method for the complete automatic plotting of directional seismic traces formed by summing geophone signals time-delayed with respect to each other, taking into account seismic velocity variations within the earth, so that the plotted mean positions of said directional traces represent actual approximate wave ray paths in the subsurface, said ray paths being both curved and distorted in scale so that the variations in amplitude along said traces represent the geologic features which gave rise to said variations in amplitude, said features being represented in approximate true subsurface depth and offset, comprising the steps of:
   a. machine generating amplitude values for a directional seismic trace by summing a plurality of side-by-side amplitude-versus-time locational seismic traces, said locational traces being relatively time-delayed with respect to each other,
   b. repeating step (a) to generate amplitude values for a plurality of directional seismic traces wherein each trace corresponds to a distinct and different moveout corresponding to the difference in arrival time of the seismic waves which caused said locational traces; and
   c. recording at least portions of said directional seismic traces upon a display surface in a form wherein each of said directional seismic traces appears to emanate from a point representing a mean location on a datum surface within the earth under investigation, and each of said directional traces proceeds away from said point into the earth under investigation in accordance with the detected directional siesmic information it represents and in accordance with the velocity ditribution of said seismic waves within said earth under investigation.

2. The method of claim 1 wherein subsurface velocity data are used to modify the directions and the scales of plotting of said directional traces as they proceed along said display surface.

3. The method of claim 1 wherein the amplitudes of selected segments of at least some of said directional seismic traces are modified to emphasize the occurence of seismic events, said sgements being selected by predetermined coincidence criteria applied in trace-to-trace comparisons of adjacent directional seismic traces.

4. The method of claim 1 wherein successive neighboring directional traces are produced by changing the total relative time delay imposed across said plurality of locational traces by an amount between 0.1 and 0.6 of the dominant period of the received seismic waves.

5. The method of claim 1 wherein successive neighboring directional traces are produced by changing the total relative time delay imposed across said plurality of locational traces by 0.3 of the dominant period of the received seismic waves.

6. The method of claim 1 in which steps (a), (b) and (c) are repreated for a plurality of sets of locational seismic traces from a corresponding plurality of geophone arrays appearing to emanate from a plurality of locations on said datum surface along a line of seismic survey.

7. The method of producing a migrated seismic cross-section in the form of a plurality of seismic traces comprising the steps of:
   a. employing machine processing means to generate a directional seismic trace from a plurality of side-by-side amplitude-versus-time locational seismic traces representing seismic waves detected by a series of geophones in a geophone array positioned relative to a datum plane adjacent the surface of the earth;
   b. repeating step (a) to generate a plurality of directional seismic traces wherein each trace corresponds to a distinct and different moveout corresponding to the difference in arrival time of the seismic waves which created said locational seismic traces; and
   c. recording at least a portion of each of said plurality of directional seismic traces in a form wherein each of said directional seismic traces appears to emanate from a point on said datum plane and wherein each of said directional seismic traces proceeds away from said point into the surface of the earth under investigation in accordance with the detected directional seismic information it represents and in accordance with the distribution of the velocity of the seismic waves within said subsurface under investigation.

8. The method of claim 1 wherein the amplitudes of selected segments of at least one of said directional seismic traces are modified to emphasize the occurrence of seismic events along said directional seismic trace of seismic waves, said segments being selected whenever predetermined coincidence criteria are satisfied by trace-to-trace comparisons of adjacent directional seismic traces.

9. A method for the construction of a migrated seismic section, retaining the complex waveforms found on the original seismic recording, comprising:
   a. machine generating amplitude values for a directional seismic trace by summing a plurality of side-by-side amplitude-versus-time locational seismic traces, said locational traces being relatively time-delayed with respect to each other for a preselected moveout,
   b. repeating step (a) to generate amplitude values for a plurality of directional seismic traces wherein each trace corresponds to a distinct and different moveout corresponding to the difference in arrival time of the seismic waves which caused said locational seismic traces; and
   c. for each directional seismic trace machine generating a curved ray path of a wave front chart having the moveout of said directional seismic trace and a common reference (projection) point representing the mean location on a datum surface related to the earth's surface of the subsurface formation under investigation, and then
   d. plotting at least a portion of the complex wave form of said directional seismic trace at a position along said ray path in accordance with the reflection time scale of said wave front chart so that said wave form is positioned in depth and offset to represent the migrated position of a seismic reflector in the subsurface.

* * * * *